US012764723B2

(12) United States Patent
Abdel Shahid et al.

(10) Patent No.: US 12,764,723 B2
(45) **Date of Patent: *Oct. 13, 2026**

(54) WIRELESS TELECOMMUNICATION USING SUBFRAMES

(71) Applicant: T-Mobile USA, Inc., Bellevue, WA (US)

(72) Inventors: Wafik Abdel Shahid, Kenmore, WA (US); Ming Shan Kwok, Seattle, WA (US); Yasmin Karimli, Kirkland, WA (US); Wei-Ming Lan, Morrisville, NC (US); Thomas P. Lucht, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 265 days.

This patent is subject to a terminal disclaimer.

(21) Appl. No.: 18/525,133

(22) Filed: Nov. 30, 2023

(65) Prior Publication Data

US 2024/0137915 A1 Apr. 25, 2024

Related U.S. Application Data

(63) Continuation of application No. 17/546,833, filed on Dec. 9, 2021, now Pat. No. 11,877,271, which is a (Continued)

(51) Int. Cl.

| | |
|---|---|
| ***H04W 72/0446*** | (2023.01) |
| ***H04W 72/23*** | (2023.01) |
| ***H04W 88/08*** | (2009.01) |

(52) U.S. Cl.
CPC ....... *H04W 72/0446* (2013.01); *H04W 72/23* (2023.01); *H04W 88/08* (2013.01)

(58) Field of Classification Search
CPC ............... H04L 5/0094; H04L 5/0053; H04W 72/0446; H04W 72/23; H04W 72/52; H04W 72/27; H04W 88/08
See application file for complete search history.

(56) References Cited

U.S. PATENT DOCUMENTS

2011/0116437 A1* 5/2011 Chen .................... H04B 7/0689 370/312
2014/0369294 A1* 12/2014 Seo ..................... H04L 27/2636 370/329

(Continued)

FOREIGN PATENT DOCUMENTS

KR 20140109891 9/2014

OTHER PUBLICATIONS

"LTE to 5G: Cellular and Broadband Innovation", Mobile Broadband Transformation, Rysavy Research/5G Americas, Aug. 2017, pp. 110-113.

(Continued)

*Primary Examiner* — Jianye Wu
(74) *Attorney, Agent, or Firm* — Lee & Hayes, P.C.

(57) ABSTRACT

A network base station can select, for each of one or more attached terminals, a respective downlink transmission mode (DTM) based at least in part on respective channel condition information (CCI). The base station can determine a subframe allocation of DTMs to subframes of a radio frame, and transmit downlink data to terminals based the subframe allocation. Additionally or alternatively, the base station can receive load information from a second base station associated with a different access network and determine the subframe allocation based on the load information. The subframe allocation can associate a specific access network with each subframe. Additionally or alternatively, the base station can send the subframe allocation to the second base station. Additionally or alternatively, the base (Continued)

station can determine a proportion of GBR traffic of a particular DTM, determine a reference-signal transmission rate associated with that DTM, and transmit reference signals accordingly.

20 Claims, 10 Drawing Sheets

Related U.S. Application Data continuation of application No. 16/182,100, filed on Nov. 6, 2018, now Pat. No. 11,212,793.

(56) References Cited

U.S. PATENT DOCUMENTS

| | | | |
|---|---|---|---|
| 2015/0009914 | A1 | 1/2015 | Chen et al. |
| 2015/0249511 | A1 | 9/2015 | Chen et al. |
| 2015/0334600 | A1 | 11/2015 | Hurd et al. |
| 2016/0007321 | A1 | 1/2016 | Zhang et al. |
| 2020/0145995 | A1 | 5/2020 | Abdel Shahid et al. |
| 2022/0104196 | A1 | 3/2022 | Abdel Shahid et al. |

OTHER PUBLICATIONS

"MBSFN (Multicast Broadcast Single Frequency Network)", LTE Quick Reference, ShareTechnote, May 1, 2018, retrieved Nov. 6, 2018 from <<https://web.archive.org/web/20180501200226/http://www.sharetechnote.com/html/Handbook_LTE_MBSFN.html>>. 13 pages.

"TM9, Another ICT Milestone in 2018", Mobile Wold Live, Feb. 22, 2018, retrieved Aug. 20, 2018 from <<https://www.mobileworldlive.com/featured-content/tm9-another-ict-milestone-in-2018/>>, 5 pages.

3GPP TR 38.802 V14.2.0, "3rd Generation Partnership Project; Technical Specification Group Radio Access Network; Study on New Radio Access Technology Physical Layer Aspect", Sep. 2017, pp. 11-12, 18-25, 38-40.

3GPP TS 37.340 V15.2.0, "3rd Generation Partnership Project; Technical Specification Group Radio Access Network; Evolved Universal Terrestrial Radio Access (E-UTRA) and NR; Multi-Connectivity; Stage 2", Jun. 2018, pp. 3-13, 23-27.

3GPP TS 38.300 V15.1.0, "3rd Generation Partnership Project; Technical Specification Group Radio Access Network; NR; NR and NG-RAN Overall Description; Stage 2", Mar. 2018, pp. 3-6, 10-23.

PCT Search Report and Written Opinion mailed on Feb. 5, 2020 for PCT Application No. PCT/US2019/056332, 14 pages.

ETSI TS 136 211 V13.1.0, "LTE; Evolved Universal Terrestrial Radio Access (E-UTRA); Physical Channels and Modulation", Apr. 2016, pp. 122-128.

ETSI TS 136 213 V13.3.0, "LTE; Evolved Universal Terrestrial Radio Access (E-UTRA); Physical Layer Procedures", Nov. 2016, pp. 50-62, 88-107, 175-177, and 233-236.

ETSI TS 136 331 V13.1.0, "LTE; Evolved Universal Terrestrial Radio Access (E-UTRA); Radio Resource Control (RRC); Protocol Specification", Apr. 2016, pp. 1, 64-66, 86-87, 337-340.

ETSI TS 136 423 V15.2.0, "Lte; Evolved Universal Terrestrial Radio Access Network (E-UTRAN); X2 Application Protocol (X2AP)", Jul. 2018, pp. 12-18, 30-31, 36-41, 51-85, 135-166, 216, 219-224, 226-233.

ETSI TS 138 214 V15.2.0, "5G; NR; Physical Layer Procedures for Data", Jul. 2018, pp. 10-11, 27-29.

ETSI TS 138 411 V15.0.0, "5G; NG-RAN; NG Layer 1", Jul. 2018, 9 pages.

Office Action for U.S. Appl. 16/182,100, mailed on Apr. 24, 2020, Shahid, "Wireless Telecommunication Using Subframes", 24 Pages.

Office Action for U.S. Appl. No. 17/546,833, mailed on Feb. 21, 2023, Inventor #1Wafik Abdel Shahid, "Wireless Telecommunication Using Subframes", 19 pages.

Office Action for US Patent Application P1677-US/697363, mailed on Apr. 26, 2021, Shahid, "Wireless Telecommunication Using Subframes", 23 pages.

* cited by examiner

WIRELESS TELECOMMUNICATION USING SUBFRAMES

CROSS-REFERENCE TO RELATED APPLICATIONS

This is a continuation application which claims priority to commonly assigned, co-pending U.S. patent application Ser. No. 17/546,833, filed Dec. 9, 2021, which is a continuation application of commonly assigned, U.S. patent application Ser. No. 16/182,100, filed Nov. 6, 2018, now U.S. Pat. No. 11,212,793, issued Dec. 28, 2021. Application Ser. No. 17/546,833 and Ser. No. 16/182,100 and U.S. Pat. No. 11,212,793 are fully incorporated herein by reference.

BACKGROUND

In a telecommunications network, a terminal can wirelessly connect to a base station in order to engage in voice calls, video calls, data transfers, or other types of communications. For example, a terminal can connect to an eNodeB (eNB) of a Long Term Evolution (LTE) network.

A base station can transmit radio frames that include data for a terminal based on a selected transmission mode (abbreviated "TM"). The base station may select a particular transmission mode for a terminal's data in a radio frame based on signal quality metrics reported by the terminal, as some transmission modes can provide higher throughput to the terminal than other transmission modes in different situations. However, the terminal may only be able to correctly interpret a received radio frame if it has information about which transmission mode the base station actually selected and used for the terminal's data in that radio frame.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. The attached drawings are for purposes of illustration and are not necessarily to scale. For brevity of illustration, in the diagrams herein, an arrow beginning with a diamond connects a first component or operation (at the diamond end) to at least one second component or operation that is or can be included in the first component or operation.

DETAILED DESCRIPTION

Overview

Figure 1:
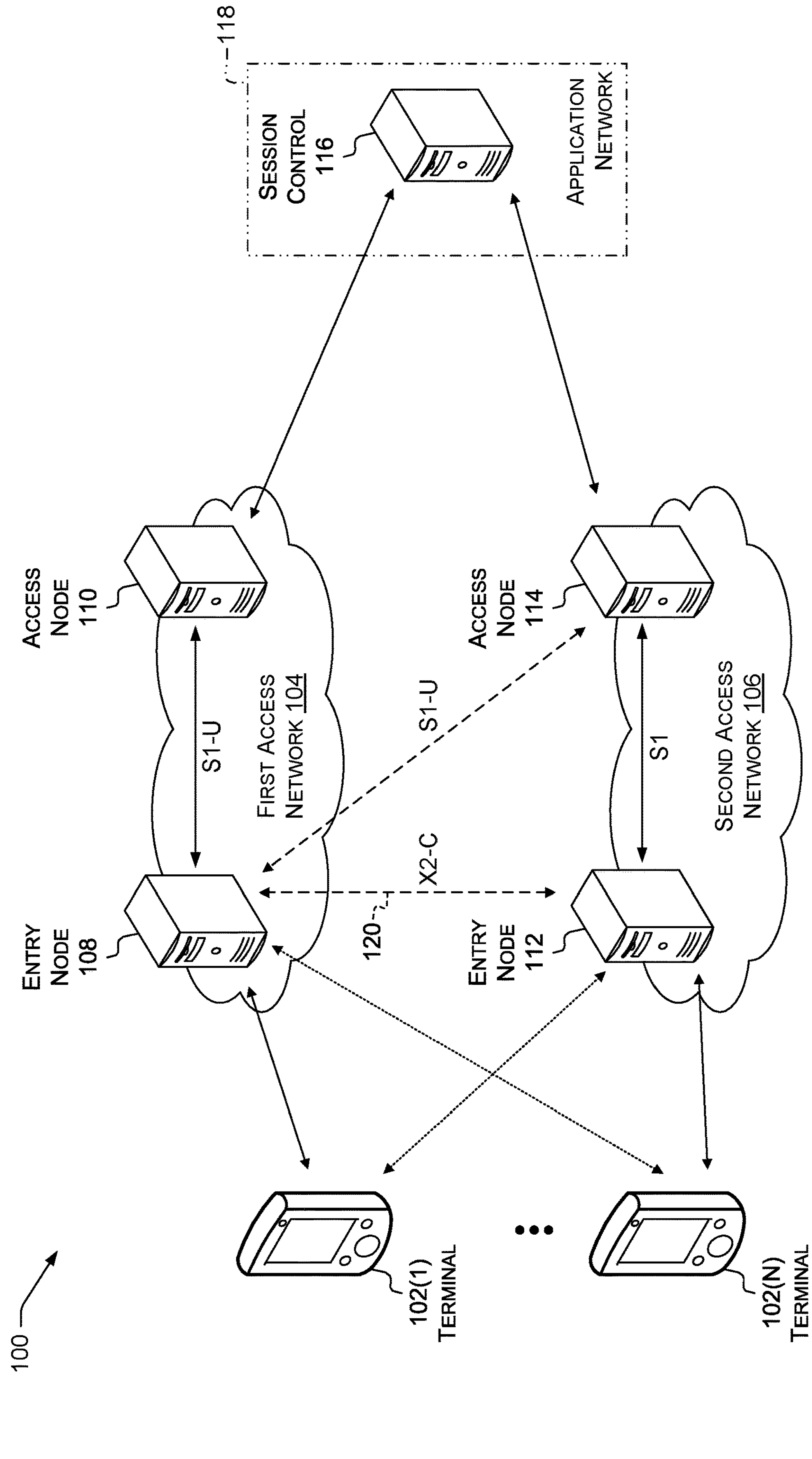
FIG. 1 is a block diagram illustrating a system for implementing network subframe-based communication according to some implementations.

A telecommunication network can include base stations, such as eNodeBs (eNBs) in an LTE network, that wirelessly communicate with user equipment (UE) or other terminals in cells serviced by the base stations. Some base stations can be configured to support multiple transmission modes. For example, base stations can be set up to use one of 3GPP's Transmission Mode Four (TM4) or Transmission Mode Nine (TM9) when transmitting data for individual terminals in radio frames. In many cases, TM4 can lead to higher throughput than TM9 when a terminal is closer to the base station, whereas TM9 can lead to higher throughput than TM4 when the terminal is farther away from the base station.

In some examples, a base station divides subframes of a radio frame among multiple transmission modes. For example, the MBMS specification permits allotting up to six of the ten subframes in an LTE radio frame as MBSFN subframes. Some prior schemes require an entire frame use a single transmission mode. In various examples herein, the MBSFN subframes can have a different transmission mode than the non-MBSFN subframes, e.g., TM9 and TM4, respectively. This can provide improved coverage or throughput to terminals both closer to the base station and farther from the base station. Accordingly, the term "MBSFN subframes" herein refers to subframes identified in network configuration information (e.g., system information block 2, SIB2) as MBSFN subframes, even if the data transmitted in those subframes does not match the MBMS format (e.g., is not carried via the physical MBMS channel, PMCH).

However, in some prior schemes, the number of MBSFN subframes per frame is statically provisioned. In those schemes, it is not possible to adjust the number of sub frames of a service to match the number of terminals actually using that service. This can lead to under-loaded and over-loaded subframes. Therefore, these prior schemes suffer a reduction in capacity when the services requested by the terminals do not match those provisioned.

In various examples herein, by contrast, the base station can change the number of MBSFN subframes each frame to match the spatial distribution of terminals attached to that base station. If most of the terminals are relatively farther away from the base station, a relatively larger number of MBSFN subframes can be used, those subframes carrying traffic using TM9. By contrast, if most of the terminals are relatively closer to the base station, a relatively smaller number of MBSFN subframes can be used. Therefore, the number of non-MBSFN, TM4 subframes can be relatively larger. Adjusting the number of MBSFN subframes dynamically permits adapting the mix of transmission modes to the spatial distribution of terminals, which can increase the capacity of the base station or the quality of service provided to those terminals.

During a TM9 subframe, the base station transmits reference signals, e.g., terminal-specific reference signals such as demodulation reference signals (DMRS or DM-RS) or channel-state information reference signals (CSIRS or CSI-RS). These signals permit determining characteristics of the radio-frequency (RF) channel between the base station and the terminal. However, these signals also consume transmission resources that are then unavailable for user data. In various examples, the base station changes how often CSI-RS signals are sent depending on the types of sessions active at a particular time (although the type or content of the CSI-RS signals does not depend on the types of sessions, in some examples). For example, if relatively more guaranteed bit-rate (GBR) sessions are active, CSI-RS signals can be transmitted more often. This can provide more accurate channel information, and so can permit adjusting transmission mode or other transmission characteristics to provide those sessions with their guaranteed bit rates. If relatively fewer GBR sessions are active, CSI-RS signals can be transmitted less often. This can provide more transmission resources (e.g., resource elements, REs) for user data transmission. In various examples, this type of reference-signal periodicity adjustment is used together with MBSFN subframe-count adjustment, as described above, to further increase capacity.

Some recent LTE and New Radio (NR) (3GPP 5G) systems use full-dimension multiple-input/multiple-output (FD-MIMO) techniques and antenna configurations (e.g., single-user, SU-MIMO, or multi-user, MU-MIMO). FD-MIMO configurations permit, for example, transmitting to a particular terminal in a relatively narrower RF beam directed to that terminal rather than in a relatively wider beam or an omnidirectional radiation pattern. This can increase capacity by permitting simultaneous, overlapping transmissions to different terminals, distinguished by their beam directions.

In various examples, capacity is further increased by using MBSFN subframe-count adjustment with FD-MIMO, or by using CSI-RS periodicity adjustment with FD-MIMO, or by using both MBSFN subframe-count adjustment and CSI-RS periodicity adjustment with FD-MIMO. Various examples herein can be used in LTE-only deployments, NR-only deployments, Evolved Universal Terrestrial Radio Access (E-UTRA)-NR Dual Connectivity (EN-DC) deployments, or other LTE/NR overlaid deployments. In EN-DC configurations, one of the LTE and the 5G can be allocated in the MBSFN subframes, and the other can be allocated in the non-MBSFN subframes (e.g., LTE in the MBSFN).

As used herein, a "terminal" is a communication device, e.g., a cellular telephone or other UE, configured to perform, or intercommunicate with systems configured to perform, techniques described herein. Terminals can include, e.g., wireless voice- or data-communication devices. A terminal can include a user interface (e.g., as does a smartphone), but is not required to. For example, a streaming server configured to provide audio or visual content on demand can be a terminal. Such a terminal may not include a user interface, and may instead respond to other terminals that form queries and send those queries to the server in response to actions taken via interfaces at those other terminals.

The term "session" as used herein includes a communications path for bidirectional exchange of data among two or more terminals. Example sessions include voice and video calls, e.g., by which human beings converse, a data communication session, e.g., between two electronic systems or between an electronic system and a human being. Sessions can be conduced using 3GPP, Signaling System 7 (SS7), CCS, or Rich Communication Suite (RCS, also known as JOYN) protocols.

Example networks carrying sessions include second-generation (2G) cellular networks such as the Global System for Mobile Communications (GSM) and third-generation (3G) cellular networks such as the Universal Mobile Telecommunications System (UMTS). Other example networks include fourth-generation (4G) cellular networks, such as LTE cellular networks carrying voice over LTE (VoLTE) sessions using Session Initiation Protocol (SIP) signaling, fifth-generation (5G) cellular networks such as 3GPP New Radio (NR) access networks, the PSTN using SS7 signaling, and data networks, such as Institute of Electrical and Electronics Engineers (IEEE) 802.11 (WIFI) networks carrying voice over Internet Protocol (VoIP) calls or other OTT sessions encapsulating, e.g., voice or video data in a way transparent to an underlying packet transport. GSM and the PSTN are examples of circuit-switched (CS) networks; LTE and WIFI are examples of packet-switched (PS) networks. In some examples, OTT traffic, e.g., of CCS sessions, can be carried via 3G General Packet Radio Service (GPRS), 4G LTE, 5G, WIFI, or other packet networks.

Subsection headers in this Detailed Description are solely for convenience in reading. Some examples include features from only one subsection. Some examples include features from more than one subsection.

Illustrative Configurations

FIG. 1 illustrates an example telecommunications network 100 and shows an overview of nodes and devices involved in provision of telecommunication services to terminals. The telecommunications network 100 includes terminals 102(1)-102(N) (individually or collectively referred to herein with reference 102), N>1. A terminal 102 may be or include a wireless phone, a tablet computer, a laptop computer, a wristwatch, or another type of terminal such as those described above.

In some examples, terminal 102 can communicate, e.g., via a first access network 104 or a second access network 106. A single-connectivity (or single-radio, SR) terminal 102 can communicate via one access network 104, 106 at a time. A dual-connectivity (dual-radio, DR) terminal 102 can communicate concurrently via both access network 104 and access network 106, as shown by the stippled lines. Some examples herein relate to DR terminals 102. In some examples, a single access network includes the illustrated components of access networks 104 and 106. In some examples, operations described herein are performed with respect to each access network 104, 106 as though a DR terminal 102 were two separate terminals, one attached to each access network 104, 106. In some examples, operations described herein are performed with reference to each access network as though a DR terminal 102 were attached to only one access network 104, 106.

In the illustrated example, first access network 104 includes a first entry node 108, e.g., a 5G gNodeB, and a first access node 110, e.g., a 5G Access and Mobility Management Function (AMF) or User Plane Function (UPF). Second access network 106 includes a second entry node 112, e.g., an LTE eNodeB, and a second access node 114, e.g., an LTE mobility management entity (MME), serving gateway (SGW), or public/packet data network (PDN) gateway (PGW). Other examples of access nodes include a GSM mobile switching center (MSC) server (MSS). For brevity herein, the term "entry node" refers to a gNodeB, eNodeB, RNC, WIFI access point (AP), or other network device that is the initial node that terminal 102 communicates with in order to access the services of a corresponding access network. Terminal 102 can communicate via the respective entry nodes 108, 112 with the respective access nodes 110, 114. In some examples, the first access network 104 may provided packet-switched connections and the second access network 106 may provide circuit-switched connections. In some examples, the first access network 104 may be a packet-switched cellular type of access network and the second access network 106 may be a packet-switched local-area-network type of access network.

A nonlimiting example EN-DC configuration is shown using dashed lines. Entry node 112, e.g., an eNodeB, serves as the master node, and entry node 108, e.g., a gNodeB, serves as the secondary node. Entry node 112 communicates with access node 114 over an S1 interface for both the control plane and the user plane. Entry node 108 communicates with entry node 112 over an X2-C interface for the control plane, and with at least one of access nodes 110, 114 over an S1-U interface for the user plane. In some EN-DC configurations, the user plane from first entry node 108 passes through access node 114, e.g., an SGW or PGW, via the illustrated S1-U interface, and access node 110 is not used.

In some examples, LTE and NR services are offered concurrently within a particular radio band or frequency allocation using the EN-DC configuration. Entry nodes 108 and 112 exchange messages, e.g., including X2 Application Protocol (X2AP) Information Elements (IEs) such as EN-DC Resource Configuration, MeNB Resource Coordination Information, or SgNB Resource Coordination Information IEs, to prevent interference due to overlapping LTE and NR transmissions.

The terminal 102 can be configured to initiate or receive a communication session, such as a voice call, a video call, or another sort of synchronous communication. Initiation of such communications may involve communication clients and Session Initiation Protocol (SIP, RFC 3261) clients communicatively connected with components of the telecommunications network, e.g., session-control node 116. In various embodiments, the session-control node 116 represents components of an Internet Protocol (IP) Multimedia Subsystem (IMS) core network. Session-control node 116 can be part of an application network 118, e.g., an IMS network or other network providing services to terminal 102. Application network 118 can also be referred to as an "upper-level" network that uses the services provided by access networks 104, 106 to communicate with terminals 102. Network 100 can include or be connected with any number of access networks 104, 106 or any number of application networks 118. The first access node 110 and the second access node 114 are examples of access nodes or devices that can control or modify communications between application network 118 and terminal 102 via access network(s) 104 or 106.

Each of the entry nodes 108, 112, the access nodes 110, 114, and the session-control node 116, may be, include, or be implemented at least partly using a server or server farm, multiple, distributed server farms, a mainframe, a work station, a PC, a laptop computer, a tablet computer, an embedded system, or any other sort of device or devices. In one implementation, one or more of first access node 110, the second access node 114, and the session-control node 116 may represent a plurality of computing devices working in communication, such as a cloud-computing node cluster. Also, the first access node 110, the second access node 114, and the session-control node 116 may each be or include nodes or devices of a telecommunications network. Examples of such components are described below with reference to FIG. 2.

In some examples, entry nodes 108 and 112 are communicatively connected to each other via a coordination channel 120, e.g., an EN-DC X2 or X2-C interface. This can permit entry nodes 108 and 112 to share data about the load on the respective access networks 104, 106, and to coordinate their operations. For example, entry nodes 108 and 112 can be embodied in a common set of computing hardware (e.g., as noted in the previous paragraph), and can communicate via inter-process communication (IPC) techniques such as signals, pipes, sockets, or shared memory, or inter-virtual-machine (inter-VM) sockets or other inter-VM communication techniques. Additionally or alternatively, entry nodes 108 and 112 can be arranged to intercommunicate with each other, e.g., directly (via a physical cable connection) or via a logically-direct connection (e.g., via a virtual private network, VPN, or tunnel connection running over a network). In some examples, entry nodes 108 and 112 are installed at a common co-location facility and are communicatively connected within that facility. Other nodes or sets of nodes can additionally or alternatively be connected using coordination channels.

Data can be sent between the terminal 102 and an entry node 108, 112 in radio frames, each having multiple subframes. In some examples, one radio frame can have a duration of ten milliseconds, and include ten distinct subframes, each having a duration of one millisecond. The subframes can each be identified by a subframe number. For example, a single radio frame can include ten subframes identified as subframe 0, subframe 1, . . . , and subframe 9. An entry node 108, 112 can send Radio Resource Control (RRC) messages to attached terminals 102 in at least some of the radio frames, e.g., indicating the radio-frame format or transmission mode in use.

A terminal 102 can send data to the appropriate entry node 108, 112 including signal quality measurements or other channel condition information (CCI). CCI can indicate how well the terminal 102 is receiving data from the entry node 108, 112. For example, CCI can include indications of received signal quality and/or received signal strength at terminal 102, or values derived from those indications. Example CCI values can include a channel quality indicator (CQI), a signal to interference and noise ratio (SINR), or any other signal quality metric.

Terminals 102 and entry nodes 108, 112 can be configured to support multiple transmission modes at the physical layer, such as transmission modes defined by 3GPP standards. Examples of such transmission modes include TM2, TM3, TM4, TM9, and TM10. Throughout this document, reference is made to TM4 and TM9 for clarity of illustration. In at least some examples, other transmission modes can be used in place of TM4 or TM9. In some cases, the transmission modes a terminal 102 or entry node 108, 112 supports can depend in part on the number of antennas that device can use to send or receive data. For example, TM4 can be used for closed-loop spatial multiplexing for transmissions by multiple-input multiple-output (MIMO) devices with multiple antennas. TM9 can also be used for spatial multiplexing at up to eight layers by some MIMO devices.

Some transmission modes can provide greater throughput from an entry node 108, 112 to a terminal 102 in certain situations. For example, in some cases TM9 can provide a throughput improvement of approximately 15% percent for terminals 102 near the edge of a cell compared to TM4, while TM4 can provide a throughput improvement of approximately 10% over TM9 for "mid-cell" terminals 102 closer to the entry node 108, 112 and a throughput improvement of approximately 30% over TM9 for "near-cell" terminals 102 that are very close to the entry node 108, 112. An entry node 108, 112 can accordingly choose one of the multiple transmission modes it supports for a particular terminal 102 based on the CCI reported by that terminal 102. For example, if a terminal 102 reports low signal quality, it may indicate that the terminal 102 is on the edge of the cell, and the entry node 108, 112 can respond by selecting TM9. However, if the terminal 102 reports higher signal quality, it may indicate that the terminal 102 is at "mid-cell" or "near-cell," and the entry node 108, 112 can respond by selecting TM4.

An entry node 108, 112 can select the transmission mode to use for a terminal 102 for every group of one or more radio frames. For example, an entry node 108, 112 can continue using a previous transmission mode or change to a different transmission mode at every radio frame, at every ten radio frames, or at intervals corresponding to any other number of radio frames.

As used herein, a message "sent to," "transmitted to," or "transmitted toward" a destination, or similar terms, can be sent directly to the destination, or can be sent via one or more intermediate network nodes or devices to the destination. Those intermediate network nodes or devices can include access nodes 110, 114. Similarly, a message "received from" a destination can be received directly from the destination, or can be received via one or more intermediate network nodes or devices from the destination. A message passing through one or more intermediate network nodes or devices can be modified by those network nodes or devices, e.g., by adding or removing framing, or by changing a presentation of at least part of the message, e.g., from a SIP start-line to a SIP header or vice versa. As used herein, a "reply" message is synonymous with a "response" message. The term "reply" is used for clarity, e.g., when discussing reply messages sent in response to the receipt of messages.

Figure 2:
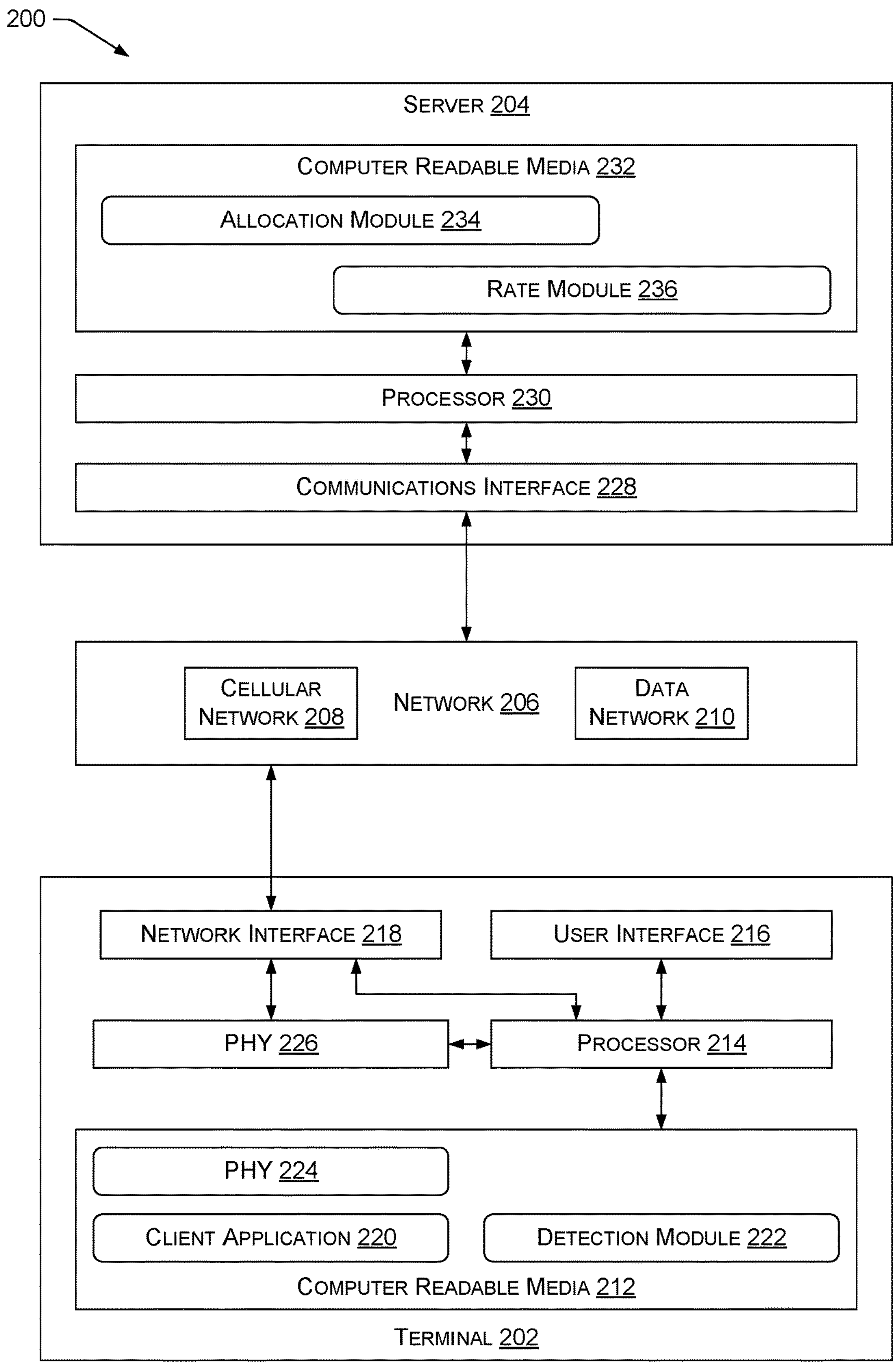
FIG. 2 is a block diagram illustrating a system that provides subframe-based communication according to some implementations.

FIG. 2 is a block diagram illustrating a system 200 permitting radio-resource management according to some implementations. The system 200 includes a terminal 202, e.g., a wireless phone or other terminal such as a terminal 102, FIG. 1, coupled to a server 204 via a network 206. The server 204 can represent an entry node 108, 112, an access node 110, 114, or another control device or information server of a telecommunications network.

The network 206 can include one or more networks, such as a cellular network 208 and a data network 210. In some examples, network 206 may include any network configured to transport IP packets, e.g., IPv4, IPv6, or any future IP-based network technology or evolution of an existing IP-based network technology. For example, the network 206 can include one or more core network(s) connected to terminal(s) via one or more access network(s).

Terminal 202 can include one or more computer readable media (CRM) 212, such as memory (e.g., random access memory (RAM), solid state drives (SSDs), or the like), disk drives (e.g., platter-based hard drives), another type of computer-readable media, or any combination thereof. Terminal 202 can include one or more processors 214 configured to execute instructions stored on CRM 212. The CRM 212 can be used to store data and to store instructions that are executable by the processors 214 to perform various functions as described herein. The CRM 212 can store various types of instructions and data, such as an operating system, device drivers, etc. The processor-executable instructions can be executed by the processors 214 to perform the various functions described herein.

The CRM 212 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 214. Tangible computer-readable media can include volatile and nonvolatile, removable and non-removable media implemented in any method or technology for storage of information, such as computer readable instructions, data structures, program modules, or other data.

Processor(s) 214 can include, e.g., e.g., one or more processor devices such as central processing units (CPUs), microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). For brevity, processor 214 and, if required, CRM 212, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. Other examples of control units can include processor 230 and, if required, CRM 232, discussed below. Accordingly, functions described as carried out by processor(s) 214 in response to instructions stored on a CRM 212 can additionally or alternatively be performed by a control unit configured to perform functions described herein without reading instructions to do so from CRM 212.

Terminal 202 can further include a user interface (UI) 216, e.g., including an electronic display device, a speaker, a vibration unit, a touchscreen, or other devices for presenting information to a user and receiving commands from the user, e.g., under control of processor(s) 214. Terminal 202 can further include one or more network interface(s) 218 configured to selectively communicate (wired or wirelessly) via the network 206, e.g., via an access network 104 or 106, under control of the processor(s) 214.

CRM 212 can include processor-executable instructions of a client application 220 and a detection module 222. The client application 220, e.g., a native or other dialer, can permit a user to originate and terminate communication sessions associated with the terminal 202, e.g., a wireless phone. The client application 220 can additionally or alternatively include an SMS, RCS, or presence client, or a client of another telephony service offered by the server 204. The client application 220 can additionally or alternatively include an app a Web browser configured to communicate via WebRTC or other non-3GPP protocols.

CRM 212 can additionally or alternatively store processor-executable instructions of a physical-layer ("PHY") module 224. PHY module 224 can perform PHY functions such as those described in 3GPP 36.211, 36.213, 38.300, 38.411, 38.413, or other LTE or NR PHY standards. In some examples, some of the PHY functions are performed by dedicated logic or hardware or firmware (e.g., implemented in an FPGA or ASIC), represented as PHY unit 226. Some examples include at most one of PHY module 224 and PHY unit 226, while other examples include both PHY module 224 and PHY unit 226.

In some examples, server 204 can communicate with (e.g., is communicatively connectable with) terminal 202 or other devices via one or more communications interface(s) 228, e.g., network transceivers for wired or wireless networks, or memory interfaces. Example communications interface(s) 228 can include ETHERNET or FIBRE CHANNEL transceivers, WIFI radios, or DDR memory-bus controllers (e.g., for DMA transfers to a network card installed in a physical server 204).

The server 204 can include one or more processors 230 and one or more CRM 232. The CRM 232 can be used to store processor-executable instructions of an allocation module 234 and a rate module 236. The processor-executable instructions can be executed by the one or more processors 230 to perform various functions described herein, e.g., with reference to FIGS. 3-8. In some examples, server 204 can be configured to, e.g., by executing the processor-executable instructions, perform functions described herein with reference to FIGS. 3-8. In some examples, at least one of communications interface 228 or processor 230 can include components to perform, or otherwise be configured to perform, PHY functions, e.g., as discussed above with respect to PHY module 224 or PHY unit 226.

Example cellular networks 208 can include a GSM or UMTS network; a universal terrestrial radio network (UTRAN) or an GSM Enhanced Data rates for GSM Evolution (EDGE) radio access network (GERAN); an evolved universal terrestrial radio access network (E-UTRAN) (e.g., LTE); a 3GPP 5G access network (e.g., NR running in non-standalone, NSA, or standalone, SA, mode); an Evolution-Data Optimized (EVDO), Advanced LTE (LTE+), Generic Access Network (GAN), Unlicensed Mobile Access (UMA), GPRS, EDGE, Advanced Mobile Phone System (AMPS), High Speed Packet Access (HSPA), or evolved HSPA (HSPA+) network.

In some examples, cellular network 208 can include a base station (e.g., an eNodeB or gNodeB), a radio network controller (RNC) (e.g., for UMTS access networks), or other elements. A cellular network 208 or a wireless data network 210 may use any sort of air interface, such as a code division multiple access (CDMA), time division multiple access (TDMA), frequency division multiple access (FDMA), or orthogonal frequency division multiple access (OFDMA) air interface.

Example data networks 210 can include a WIFI (IEEE 802.11), BLUETOOTH (IEEE 802.15.1), or other LAN or PAN access networks, e.g., in the IEEE 802.1* family, a satellite or terrestrial wide-area access network such as a wireless microwave access (WIMAX) network, a wired network such as the PSTN, an optical network such as a Synchronous Optical NETwork (SONET), or other fixed wireless or non-wireless networks such as Asynchronous Transfer Mode (ATM) or Ethernet.

In some examples, data network 210 (e.g., a non-cellular network) can carry voice traffic using VoIP or other technologies as well as data traffic, or cellular network 208 can carry data packets using High Speed Packet Access (HSPA), LTE, or other technologies, as well as voice traffic. Similarly, in some examples, cellular network 208 can carry data traffic as well as voice traffic. For example, many LTE and NR networks carry both data and voice in a PS format, e.g., according to the voice-over-LTE (VoLTE) standard for PS voice.

The network 206 may also include a number of devices or nodes not illustrated in FIG. 1 or 2. Nonlimiting examples of such devices or nodes include an Access Transfer Gateway (ATGW), a serving GPRS support node (SGSN), a gateway GPRS support node (GGSN), a policy control rules function (PCRF) node, a session border controller (SBC), or a non-3GPP-access interworking function (N3IWF). Similarly, throughout this disclosure, other nodes or devices can be used in conjunction with listed nodes or devices. For example, a telecommunications network can include many core network nodes or devices, only some of which implement functions described herein for core network nodes or devices.

Illustrative Operations

Figure 3:
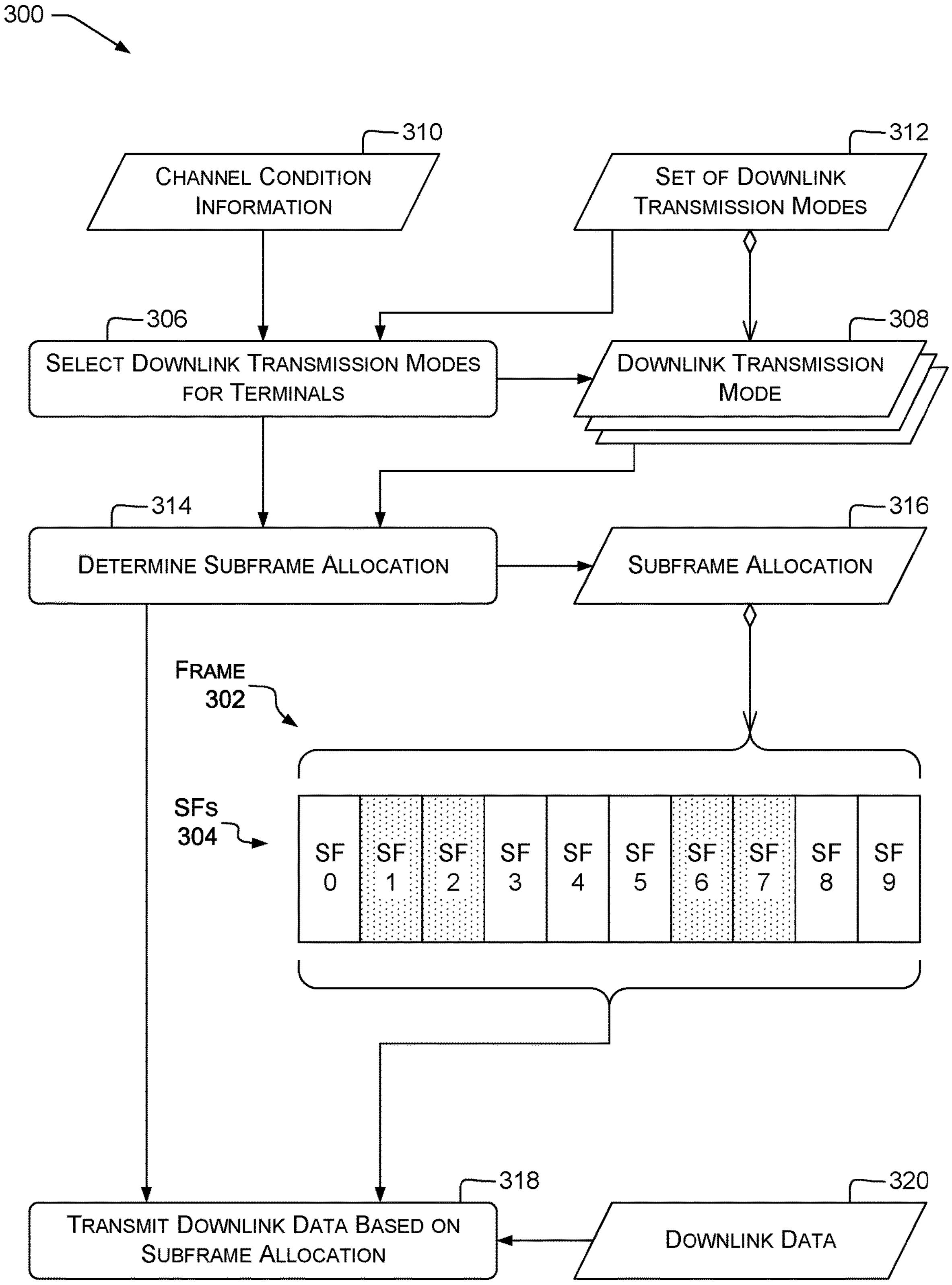
FIG. 3 illustrates an example process for allocating radio resources and transmitting data according to some implementations.

FIG. 3 is a dataflow diagram illustrating an example process 300 for allocating radio resources, and related data items. FIG. 3 also shows an example radio frame 302 comprising a plurality of subframes 304. Process 300 can be performed, e.g., by a control unit of a network base station, e.g., a control unit of the server 204 (for example, an entry node 108, 112). In some examples, the control device includes one or more processors (e.g., processor 230) configured to perform operations described below, e.g., in response to computer program instructions of the allocation module 234. In some examples, the network base station can include a communications interface 228 configured to communicate wirelessly with one or more terminals 102, 202 of the network 100, 206.

Operations shown in FIG. 3 and in FIGS. 4-10, discussed below, can be performed in any order except when otherwise specified, or when data from an earlier step is used in a later step. For clarity of explanation, reference is herein made to various components shown in FIGS. 1-2 that can carry out or participate in the steps of the example method, and to various operations and messages that can occur or be transmitted while the example method is carried out or as part of the example method. It should be noted, however, that other components can be used; that is, example method(s) shown in FIGS. 3-10 are not limited to being carried out by the identified components, and are not limited to including the identified operations or messages.

At 306, the control unit can select, for each of the one or more terminals, a respective downlink transmission mode (DTM) 308 based at least in part on respective channel condition information (CCI) 310. Example DTMs can include 3GPP TM4 or TM9. CCI 310 can indicate or represent properties of the RF environment along path(s) taken between the base station and a terminal 102. Such properties can include, e.g., propagation delay, multipath characteristics, fading (including frequency-sensitive fading), attenuation, or phase shifts. Example forms of CCI 310 described in 3GPP 36.213 v13.3.0 § 7.2 can include, a Channel Quality Indicator (CQI), a precoding matrix indicator (PMI), a precoding type indicator (PTI), a CSI-RS resource indicator (CRI), a rank indication (RI), or a beam index (e.g., for FD-MIMO). In some examples, the control unit can select the DTM 308 based at least in part on, or based exclusively on, an uplink SINR measured by the network base station (e.g., an eNB).

The control unit can select which DTM 308 to use for a terminal's data in one or more radio frames based on signal quality metrics reported by the terminal, e.g., in or as CCI 310. For example, a terminal may report that it is receiving data from the base station at a relatively higher signal quality, which often occurs when the terminal is relatively closer to the base station and is considered to be "near-cell" or "mid-cell." In this situation, the control unit may choose to use TM4 for the terminal's data in the next radio frame. However, if the terminal reports that it is receiving data at a relatively lower signal quality, which can often occur if the terminal is located relatively farther from the base station (e.g., at the edge of a cell), the control unit may instead choose to use TM9 for the terminal's data in the next radio frame, because TM9 can often lead to higher throughput at the cell edge than TM4.

In some examples, the respective DTMs can be selected from a predetermined set 312 of DTMs ("Downlink Transmission Mode Library"). Set 312 can include at least one DTM 308, or a plurality of DTMs 308. The set 312 of DTMs can include, e.g., only DTMs supported by particular terminal(s) 102 that are connected to the base station. In some examples, the set 312 of DTMs 308 includes or consists of TM4 and TM9.

In some examples, e.g., some EN-DC deployments, the DTMs 308 are associated with respective, different types of access network. For example, LTE can be associated with TM9 and another type of access network with TM4, or vice versa. In some of these examples, operation 306 can include selecting a common DTM 308 for all the terminals. For example, operation 306 can include selecting, at an eNodeB, TM9 (or TM4) as the DTM 308 for all terminals attached to the eNodeB. Additionally or alternatively, operation 306 can include selecting, at a gNodeB, TM4 (or TM9) as the DTM 308 for all terminals attached to the gNodeB.

At 314, the control unit can determine a subframe allocation 316 based at least in part on the selected DTMs 308 of the predetermined set 312 of DTMs. The subframe allocation 316 can indicate exactly one DTM 308 of the predetermined set 312 of DTMs for each of a plurality of the subframes 304 of the radio frame 302. In the illustrated example, subframes 304 numbers 1, 2, 6, and 7 (shown hatched) are associated by subframe allocation 316 with a first DTM 308, e.g., TM9, and remaining subframes 304 numbers 0, 3, 4, 5, 8, and 9 are associated with a second, different DTM 308, e.g., TM4. In some examples, frame 302 includes ten subframes 304, and subframe allocation 316 can assign between zero and six of the ten subframes 304 as MBSFN subframes.

At 318, the control unit can transmit downlink data 320 to at least one of the one or more terminals 102 using the communications interface 228 based at least in part on the subframe allocation 316. For example, the control unit can transmit at least some of the downlink data 320 using the first DTM 308 in subframes 304 numbers 1, 2, 6, and 7, or can transmit at least some of the downlink data 320 using the second DTM 308 in subframes 304 numbers 0, 3, 4, 5, 8, and 9. Data can be transmitted, e.g., as in the standards for LTE, NR, WIFI, or other access network(s) 104, 106 (e.g., on an LTE or NR PDSCH). In some examples, downlink data 320 is transmitted on a PDSCH within an MBSFN subframe, e.g., using TM9 or other transmission modes. In some examples, the hatched subframes are MBSFN subframes. In some examples, downlink data 320 includes or is associated with control information, e.g., transmitted on a PDCCH. PDSCH data and corresponding PDSCH information can be transmitted in the same subframe or in different subframes.

In some examples, the network base station (e.g., entry node 108 or 112) includes a full-dimension multiple-input multiple-output (FD-MIMO) antenna array connected with the communications interface 228. The FD-MIMO antenna array can include, e.g., one or more two-dimensional arrays of antennas, spaced apart or overlaid. Each two-dimensional array of antennas can be associated with a respective, different polarization of electromagnetic radiation emitted by that array of antennas. FD-MIMO antennas can permit beamforming in both azimuthal and elevational directions. Accordingly, in some examples, operation 318 can include transmitting at least some of the downlink data 320 to a first terminal 102 of the one or more terminals in a formed beam using the FD-MIMO antenna array. In some examples using TM9 FD-MIMO for LTE, 16×2 or 32×2 MU-MIMO configurations can be used.

At least one example has at least some of, or all of, the characteristics and features given in this paragraph. The predetermined set 312 of DTMs consists of 3GPP Transmission Mode Four and 3GPP Transmission Mode Nine. The subframe allocation 316 indicates a first subset (e.g., subset 514, FIG. 5) of the plurality of subframes and a second, disjoint subset (e.g., subset 516, FIG. 5) of the plurality of subframes. The subframe allocation assigns the subframes of the first subset as Multimedia Broadcast Multicast Service (MBMS) Single Frequency Network (MBSFN) subframes associated with Transmission Mode Nine. The subframe allocation assigns the subframes of the second subset as non-MBSFN subframes associated with Transmission Mode Four.

Figure 4:
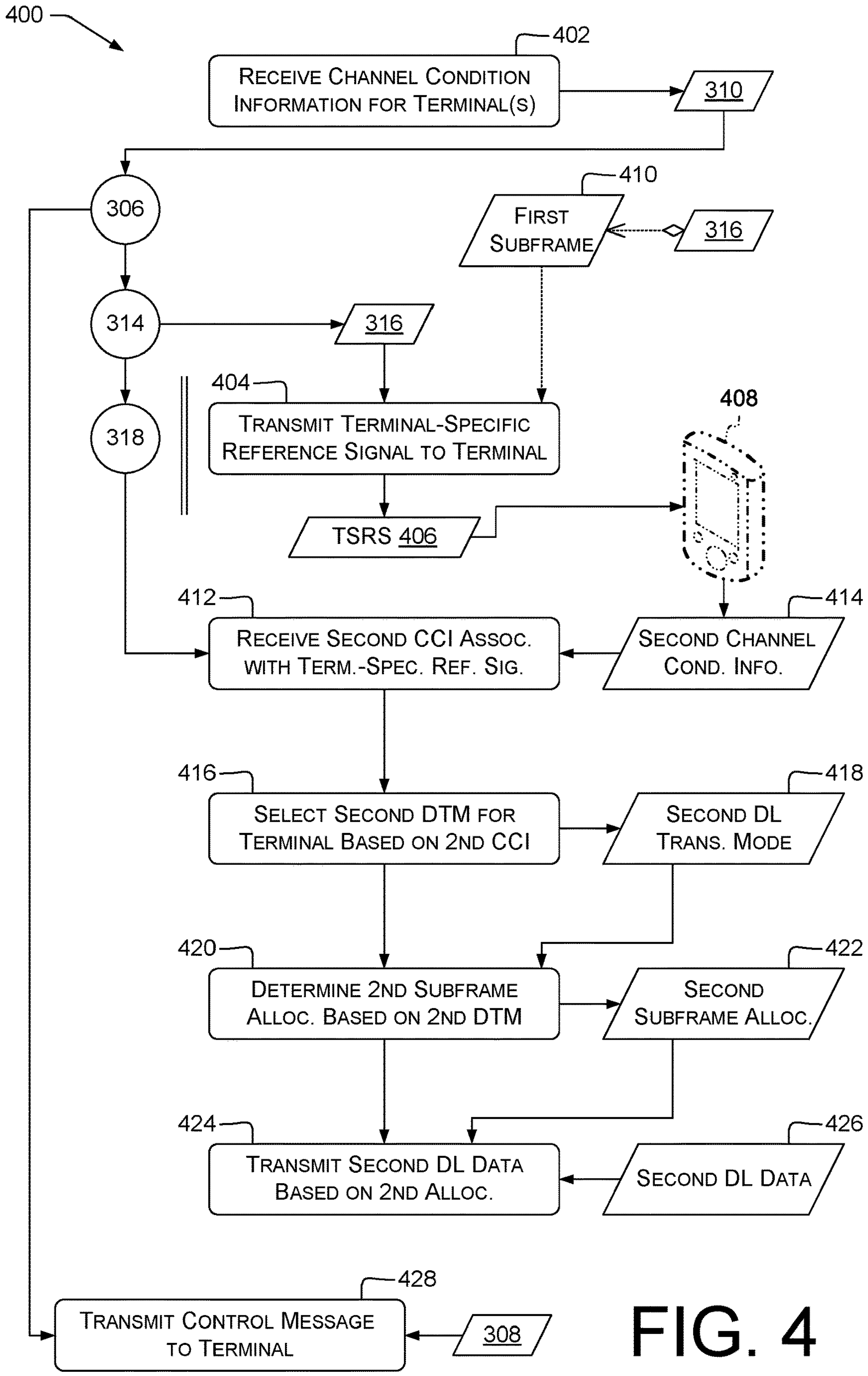
FIG. 4 illustrates example processes for allocating radio resources and transmitting data according to some implementations.

FIG. 4 is a dataflow diagram illustrating example processes 400 for allocating radio resources, and related data items. Processes 400 can be performed, e.g., by a control unit of network base station or other server 204, e.g., in response to computer program operations of the allocation module 234. In some examples, operation 402 can precede operation 306. In some examples, operation 428 can follow operation 306. In some examples, operation 404 can be performed as part of, in parallel with (as shown), or after operation 318. In some examples, operation 412 can be performed in parallel with or after (as shown) operation 318, after operation 404, or after both operation 318 and operation 404.

At 402, the control unit can receive, using the communications interface 228, the respective channel condition information 310 for at least one of the one or more terminals 102. For example, the control unit can receive the CCI via a transmission on the PUSCH from a terminal 102. This can be done, e.g., as set forth in the 3GPP specifications for uplink data transmission. In some examples, unlike the 3GPP specifications, uplink data is transmitted during an MBSFN subframe, e.g., using TM9 or another transmission mode indicated in the subframe allocation 316.

At 404, the control unit can transmit a terminal-specific reference signal 406 to a first terminal 408 (shown in phantom) of the one or more terminals using the communications interface based at least in part on the subframe allocation 316. Operation 404 can be performed as part of, or (as shown) in parallel with operation 318. For example, the terminal-specific reference signal 406 can be a CSI-RS transmitted during a subframe indicated in the subframe allocation 316 as using a DTM 308 such as TM9.

In some examples, represented with stippled lines, the first subframe allocation 316 includes an assignment of a first subframe 410 of the plurality of subframes 304. In some of these examples, the control unit can transmit the terminal-specific reference signal 406 during the first subframe 410. For example, the first subframe 410 can be as an MBSFN subframe associated with TM9, and the terminal-specific reference signal 406 can be a CSI-RS signal.

At 412, the control unit can receive, subsequent to operation 404, second CCI 414 associated with the terminal-specific reference signal 406. In some examples, second CCI 414 can be associated with the same DTM 308, 3GPP LTE/NR antenna port, or other transmission parameter as is the CCI 310 associated with terminal 408. For example, CCI 310 can include a first CRI determined at terminal 408 based on a first CSI-RS, and second CCI 414 can include a second CRI determined at terminal 408 based on a second CSI-RS, namely the terminal-specific reference signal 406.

At 416, the control unit can select a second DTM 418 for the first terminal 408 based at least in part on the second CCI 414. In some examples, as terminal 408 moves toward the network base station, TM4 may become more desirable. Therefore, the control unit may select TM9 as the DTM 308 for that terminal, and later select TM4 as the second DTM 418 for that terminal. In other examples, as terminal 408 moves away from the network base station, TM9 may become more desirable (e.g., as indicated by lower quality reports in a CQI sent using TM4 with RI=1). Therefore, the control unit may select TM4 as the DTM 308 for that terminal, and later select TM9 as the second DTM 418 for that terminal.

At 420, the control unit can determine a second subframe allocation 422 based at least in part on the second DTM 418. Examples are discussed herein, e.g., with reference to operation 314.

In some examples in which the first subframe 410 is assigned by the first subframe allocation 316 to TM9, the control unit can determine the second subframe allocation 422 assigning the first subframe 410 as a non-MBSFN subframe associated with TM4. In some examples in which the first subframe 410 is assigned by the first subframe allocation 316 to TM4, the control unit can determine the second subframe allocation 422 assigning the first subframe 410 as an MBSFN subframe associated with TM9. This can permit more effectively balancing load between TM4 and TM9 users, and can reduce latency that would otherwise be incurred by switching DTM per frame 302 rather than per subframe 304.

At 424, the control unit can transmit second downlink data 426 to the first terminal 408 using the communications interface 228 based at least in part on the second subframe allocation 422. Examples are discussed herein, e.g., with reference to operation 318. As discussed above, second downlink data 426 can include or be associated with control information.

At 428, in some examples, the control unit can transmit a control message, e.g., a Radio Resource Control (RRC) reconfiguration message (e.g., RRCConnectionReconfiguration) or other message, to the terminal 102. The reconfiguration message can tell the terminal 102 which transmission mode to use when interpreting data in subsequent radio frame(s) 302. RRC messages are sent in data packets according to the Packet Data Convergence Protocol (PDCP), and are interpreted by terminal 102 at the network layer. Accordingly, when an RRC message indicates a change to the transmission mode, the terminal 102 can process the RRC message at the network layer to discover the change and then pass information about the new transmission mode through the medium access control (MAC) layer to the physical layer (e.g., PHY module 224 or PHY unit 226) so that received radio frames 302 can be interpreted at the physical layer using the correct transmission mode. Operation 428 can be performed after selecting the DTM 308, e.g., when the control unit changes the DTM 308 it is using for a particular terminal 102. Additionally or alternatively, operation 428 can be performed periodically on a schedule.

Figure 5:
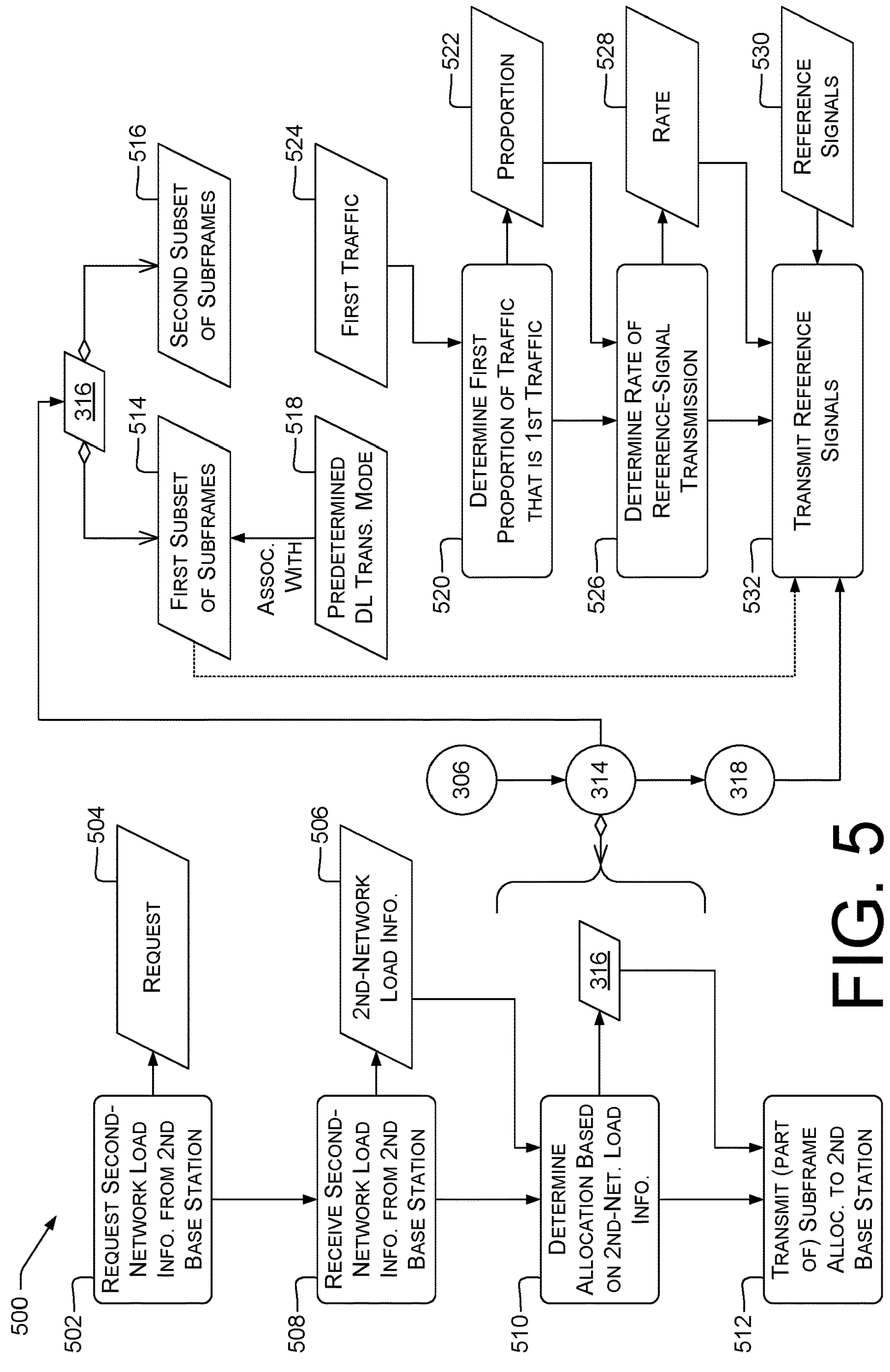
FIG. 5 illustrates example processes for allocating radio resources and transmitting control signals according to some implementations.

FIG. 5 is a dataflow diagram illustrating example processes 500 for allocating radio resources, and related data items. Processes 500 can be performed, e.g., by a control unit of network base station or other server 204, e.g., in response to computer program operations of the allocation module 234 (e.g., operations 502-512) or the rate module 236 (e.g., operations 520-532). In some examples, operation 314 can include operation 510. In some examples, operation 318 can be followed by operation 532.

In some examples, the network base station is associated with a first access network of a first type, e.g., access network 104 or 106. Various examples permit load-balancing between access networks, e.g., in a co-channel spectrum coexistence scenario such as EN-DC. Various examples provide time-division multiplexing between access networks sharing a spectrum allocation. In some examples, the network base station is communicatively connectable with a second base station associated with a second access network of a second, different type.

For example (e.g., in some EN-DC configurations such as those shown in FIG. 1), the base station can be entry node 112, the first access network can be access network 106, the second base station can be entry node 108, and the second access network can be access network 104. Alternatively, the base station can be entry node 108, the first access network can be access network 104, the second base station can be entry node 112, and the second access network can be access network 106. In some examples, the first and second types can be, respectively, one of: LTE and NR, NR and LTE, CS and PS, PS and CS, 3GPP and non-3GPP, non-3GPP and 3GPP, or combinations thereof.

At 502, the control unit can send a request 504 for second-network load information 506 to the second base station. Operation 502 can be performed before operation 508, in some examples. For example, the second base station can transmit second-network load information 506 in response to request 504 in addition to or instead of spontaneously.

At 508, the control unit can receive, from the second base station, the second-network load information 506 of the second access network. In some examples, the second base station can be configured to transmit the second-network load information 506 periodically, substantially periodically, or on demand. In some examples using operation 502 and operation 508, the second-network load information 506 can be received in response to request 504. In some examples not using operation 502, the second-network load information 506 can be received after being spontaneously transmitted by the second base station, e.g., on a schedule.

In various examples, the base station can send the request 504, or the second base station can send the second-network load information 506, in response to load or load changes meeting predetermined criteria. For example, if the load on the first access network significantly increases or decreases, rises above a first threshold, or falls below a second threshold, the control unit can send the request 504 to adapt traffic on the second access network to the changed conditions, or vice versa. Additionally or alternatively, the base station can send the request 504, or the second base station can send the second-network load information 506, periodically (e.g., substantially on a defined schedule or at predefined time intervals), or on request of the base station, the second base station, or a common controller.

In some examples, operation 508 can include receiving the second-network load information 506 via an X2 interface, e.g., the X2-C interface shown in FIG. 1, or another coordination channel 120. The second-network load information 506 can be carried in IEs defined by X2AP, e.g., any of the IEs that can be carried as part of an X2AP Load Information message (3GPP 36.423 v15.2.0 § 8.3.1), or in other IEs. In some examples, the second-network load information 506 can indicate or represent the number of terminals 102 attached to the second base station. Additionally or alternatively, the second-network load information 506 can indicate or represent the number of terminals 102 attached to the second base station that meet any of the following criteria, or the proportion of the terminals 102 attached to the second base station that meet any of the following criteria: attached via a particular network technology (e.g., LTE or NR); having CCI indicating that use of a particular DTM would be preferred (e.g., indicating that TM4 would be preferred, such as may be the case for a terminal 102 relatively closer to the second-network base station, or indicating that TM9 would be preferred, such as may be the case for a terminal 102 relatively farther from the second-network base station); or having a location (e.g., GPS-determined, triangulated, or range based on round-trip time, RTT) with respect to the second base station indicating that use of a particular DTM would be preferred. CCI or location can be mapped to an indication of a DTM preference, e.g., using a stored lookup table provisioned in the second base station and having empirically-determined values. Additionally or alternatively, the second-network load information 506 can indicate or represent the amount of traffic on the second access network, e.g., in bits per second, resource blocks allocated per second, a percentage of a cap of either of those, or other network-utilization measures. Second-network load information 506 can include instantaneous or smoothed values for any of the foregoing data values, e.g., arithmetic or exponentially-weighted moving averages, or windowed sums, over a predetermined time period (e.g., 1 min or 5 min).

At 510, the control unit can determine the subframe allocation 316 based at least in part on the second-network load information 506. The subframe allocation 316 can indicate, for each subframe 304 of the plurality of subframes in the frame 302, whether that subframe 304 is associated with the first access network or the second access network. For example, LTE can be assigned to MBSFN subframes or to non-MBSFN subframes. In some examples using operation 510, operation 306 can include selecting a single DTM 308 for at least some of, or all of, the terminals 102 attached to the network base station. For example, TM9 can be assigned to all LTE terminals, TM4 to all NR terminals, or TM4 to all LTE terminals. In other examples, some subframes assigned to the first access network can use a first DTM 308 and other subframes assigned to the first access network can use a second, different DTM 308, or likewise for the second access network. For example, some LTE subframes 304 within a frame 302 can be TM4 and others can be TM9, or some NR subframes 304 within a frame 302 can be TM4 and others can be TM9, or both. This can permit both load-balancing between two access networks and using network capacity effectively depending on the spatial distribution of terminals 102 attached to a particular network base station.

At 512, the control unit can transmit at least a portion of the subframe allocation 316 to the second base station, e.g., via an X2 or X2-C interface. For example, the control unit can transmit the entire subframe allocation 316, or less than the entire subframe allocation 316. In some examples, operation 512 includes transmitting at least those portions of the subframe allocation 316 indicating which subframes are available for use by the second access network, or at least portions of the subframe allocation 316 that are sufficient to permit the second base station to reliably determine which subframes are available for use by the second access network (e.g., transmitting the total number of subframes, plus identifiers of the subframes in used by the first access network). This permits each of the first base station and the second base station to schedule transmissions only in subframes assigned to the corresponding access network, which can reduce interference and permit co-channel spectrum coexistence between, e.g., LTE and NR.

In some examples, the subframe allocation 316 indicates a first subset 514 of the plurality of subframes 304 and a second, disjoint subset 516 of the plurality of subframes 304. The subframe allocation 316 can include additional subframes that are part of neither the first subset 514 nor the second subset 516 in some examples. In other examples, each subframe 304 of the frame 302 can be a member of exactly one of the subsets 514, 516. The first subset 514 can be associated with a predetermined DTM 518 of the predetermined set 312 of DTMs. For example, the first subset 514 can be MBSFN subframes and the second subset 516 non-MBSFN subframes, or vice versa.

At 520, in some of these examples, the control unit can determine a first proportion 522 of traffic being carried by the network base station that is first traffic 524. The first traffic 524 can be guaranteed bit-rate (GBR) traffic and can be associated with the predetermined DTM 518. For example, the first traffic 524 can be VoLTE or ViLTE traffic using TM9 (or TM4). Examples are discussed below, e.g., with reference to operation 602.

At 526, the control unit can determine, based at least in part on the first proportion 522, a first rate 528 of transmission of reference signals 530 associated with the predetermined DTM 518 (e.g., CSI-RS, for DTM 518 as TM9). Examples are discussed below, e.g., with reference to operation 610.

At 532, the control unit can transmit the reference signals 530 associated with the predetermined DTM 518 (connection shown stippled solely for clarity of the drawing) substantially at the first rate 528 and during one or more subframes 304 of the first subset 514. Examples are discussed below, e.g., with reference to operation 616.

Figure 6:
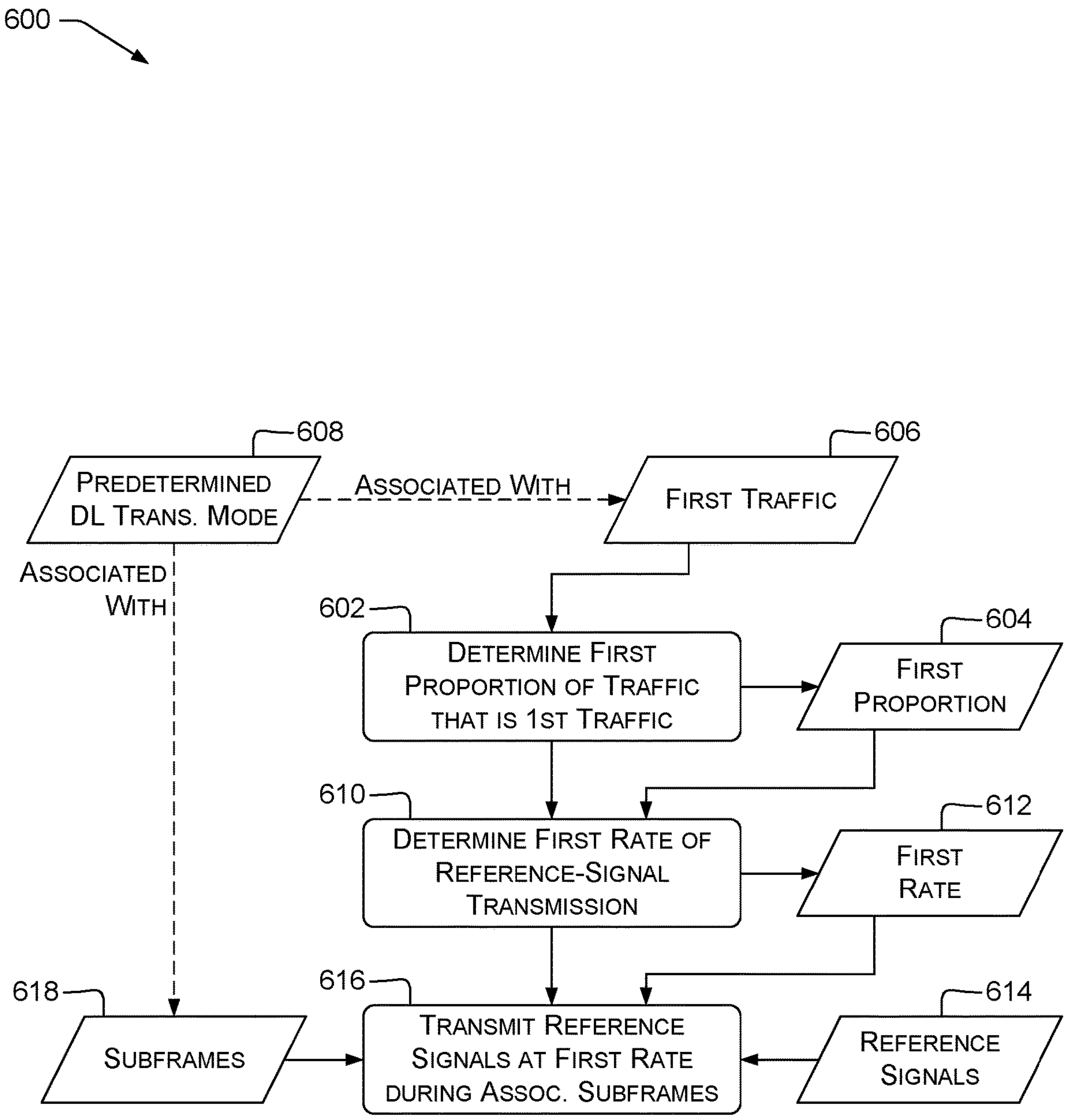
FIG. 6 illustrates an example process for controlling the transmission of reference signals according to some implementations.

FIG. 6 is a dataflow diagram illustrating an example process 600 for controlling the transmission of reference signals, and related data items. Process 600 can be performed, e.g., by a control unit of a network base station, e.g., a control unit of the server 204 (for example, an entry node 108, 112). In some examples, the control device includes one or more processors (e.g., processor 230) configured to perform operations described below, e.g., in response to computer program instructions of the rate module 236. In some examples, the network base station can include a communications interface 228 configured to communicate wirelessly with one or more terminals 102, 202 of the network 100, 206.

At 602, the control unit can determine a first proportion 604 of traffic being carried by the network base station that is first traffic 606. The first traffic 606 can be guaranteed bit-rate (GBR) traffic, can be associated with terminals communicating with the network base station using a predetermined downlink transmission mode (DTM) 608 (e.g., TM9 or TM4), or both. The first proportion 604 can be a proportion of the number of attached terminals 102, the number of subframes being used per unit time (e.g., per radio frame), the number of bits being transferred per unit time (e.g., bits per second), or other traffic or load metrics.

At 610, the control unit can determine, based at least in part on the first proportion 604, a first rate 612 of transmission of reference signals 614 associated with the predetermined DTM 608. For example, the rate can be one transmission of reference signals 614 every r ms, r being from about 5 ms to about 60 ms. In some examples, e.g., in which the predetermined DTM 608 is TM9, the reference signals associated with the predetermined DTM 608 can be CSI-RS signals.

At 616, the control unit can transmit the reference signals associated with the predetermined DTM 608 substantially at the first rate 612 and during one or more subframes 618 associated with the predetermined DTM 608. This can be done, e.g., as specified by the standards for the pertinent access network 104, 106. In some examples, the control unit can transmit CSI-RS or DMRS reference signals during MBSFN subframes associated with TM9 as the predetermined DTM 518.

Figure 7:
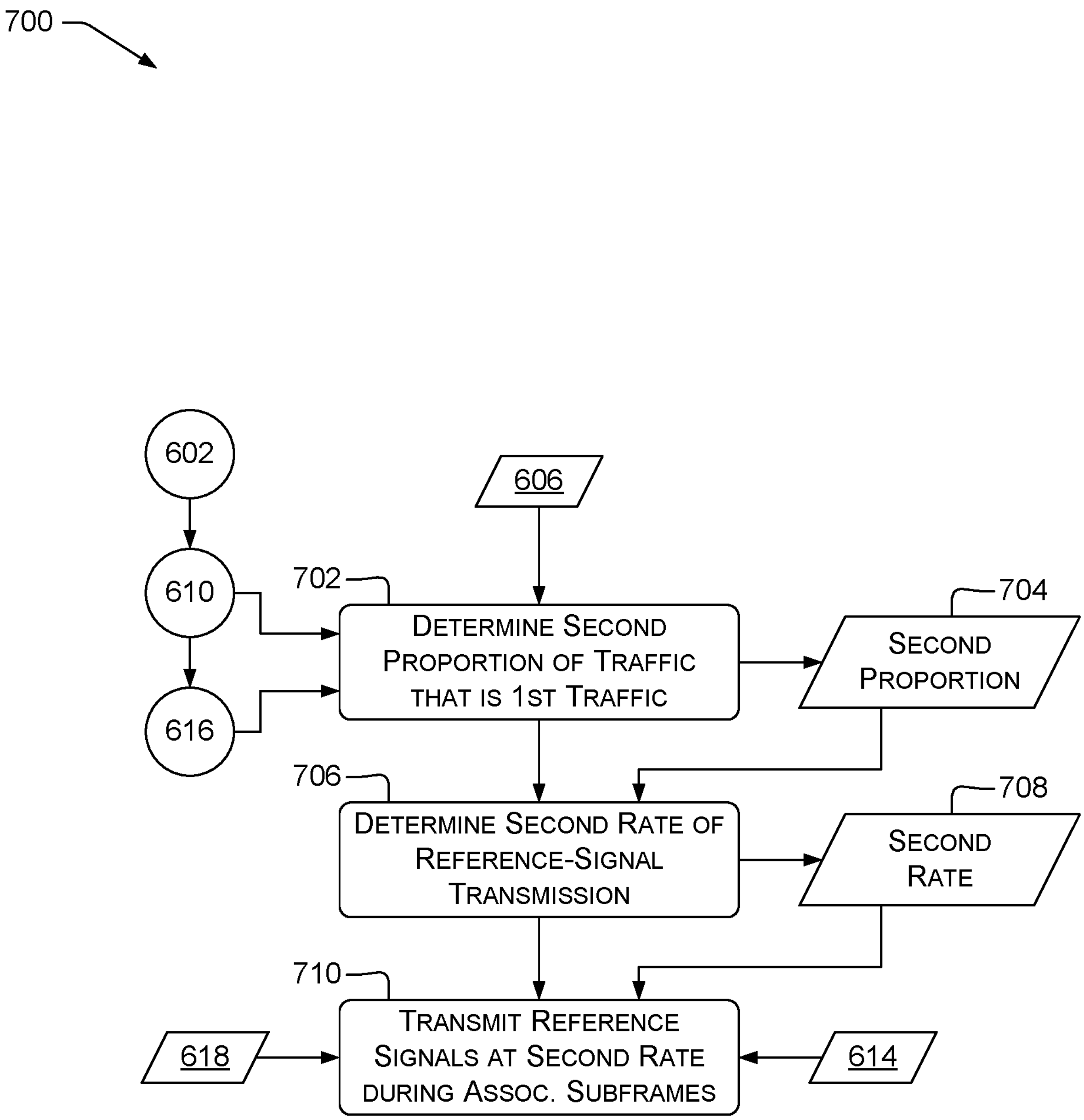
FIG. 7 illustrates example processes for controlling the transmission of reference signals according to some implementations.

FIG. 7 is a dataflow diagram illustrating example processes 700 for controlling the transmission of reference signals, and related data items. Processes 700 can be performed, e.g., by a control unit of network base station or other server 204, e.g., in response to computer program operations of the rate module 236. In some examples, operation 702 can be performed after operation 610 or 616, e.g., after determining the first rate 612.

At 702, the control unit can determine a second proportion 704 of traffic being carried by the network base station that is first traffic 606. Examples are discussed herein, e.g., with reference to operation 602. In some examples, the first proportion 604 is higher than the second proportion 704. In some examples, operations 602 and 702 represent successive instances in a sequence of proportion determinations, e.g., scheduled stochastically or at regular intervals. For example, a proportion 604, 704 can be determined about every p seconds, e.g., p=0.1. In some examples, p can be based on the number of GBR bearers concurrently connected to the network base station.

At 706, the control unit can determine, based at least in part on the second proportion 704, a second rate 708 of transmission of reference signals 614 associated with the predetermined DTM 608. Examples are discussed herein, e.g., with reference to operation 610. In some examples, the first rate 612 is higher than the second rate 708. For example, the rate can be positively correlated with (e.g., directly proportional to, whether linearly, multiplicatively, or exponentially) the proportion of first traffic 606. As noted above, this can provide more accurate CCI (e.g., CCI 310) associated with GBR traffic, which can improve the reception of data or reduce the required retransmission rate of packets, and thereby maintain GBR throughput. This can also provide increased capacity for delay-tolerant traffic such as non-GBR traffic. In some examples, when the number of concurrently-connected GBR bearers drops below a threshold, the network base station can update the first rate 612 or the second rate 708.

At 710, the control unit can transmit the reference signals 614 associated with the predetermined DTM 608 substantially at the second rate 708 and during the one or more subframes 618 associated with the predetermined DTM 608. Examples are discussed herein, e.g., with reference to operation 616.

Figure 8:
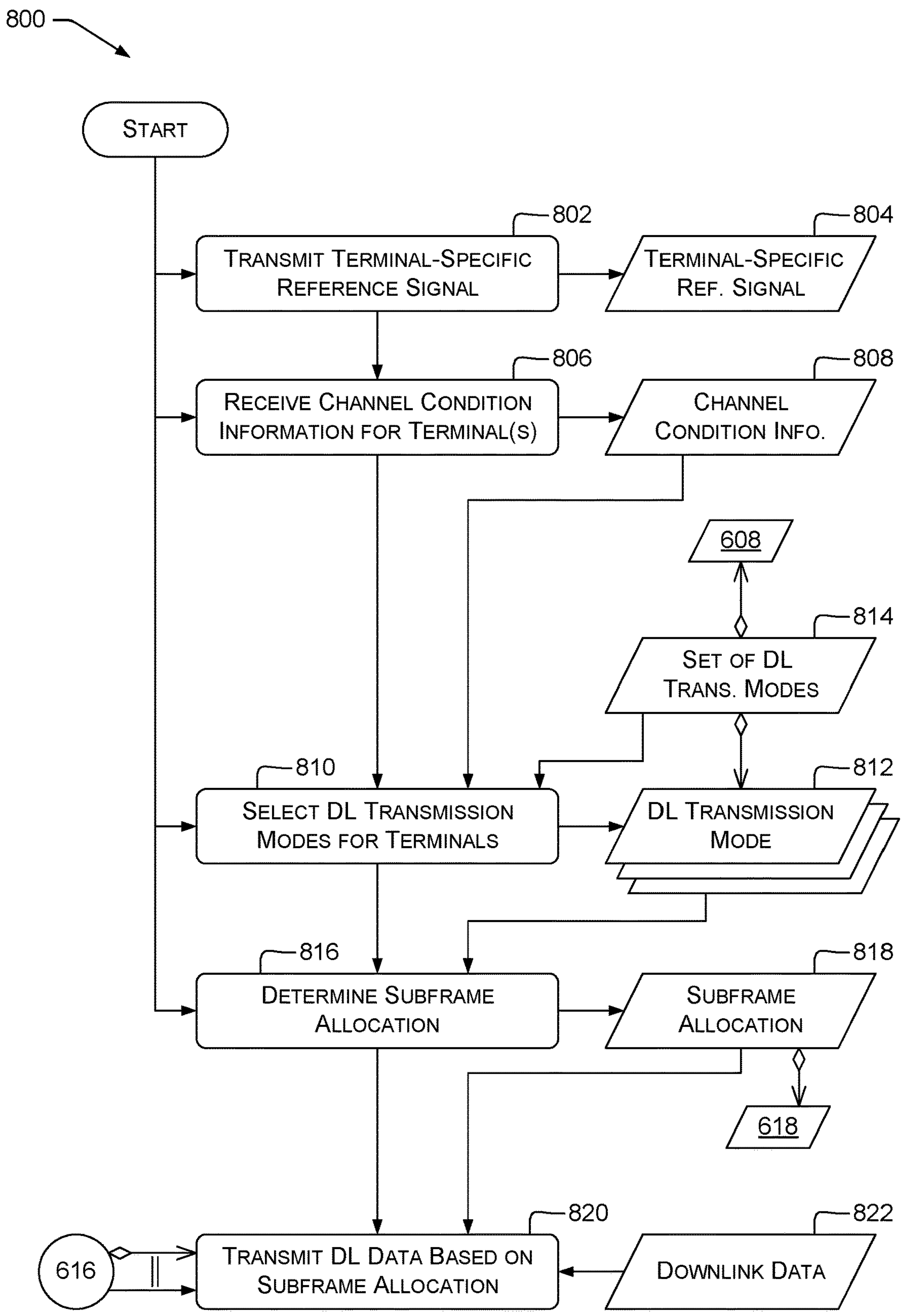
FIG. 8 illustrates example processes for transmitting downlink data according to some implementations.

FIG. 8 is a dataflow diagram illustrating example processes 800 for allocating radio resources and transmitting downlink data, and related data items. Processes 800 can be performed, e.g., by a control unit of network base station or other server 204, e.g., in response to computer program operations of the allocation module 234 or the rate module 236. In some examples, processing can begin with operation 802, 806, 810, or 816. Some examples use operation 816 and omit operation 810. In some examples, operation 616 can include, be followed by, or be performed in parallel with, operation 820. In some examples, at least one of operations 802, 806, 810, and 816 is performed before operation 616.

At 802, the control unit can transmit a first terminal-specific reference signal 804 (which can represent terminal-specific reference signal 406) of the reference signals 614 to a first terminal in one of the one or more subframes associated with the predetermined DTM 608. Examples are discussed herein, e.g., with reference to operation 404.

At 806, the control unit can receive first CCI 808 from the first terminal. The first CCI 808 can be associated with the first terminal-specific reference signal 804. Examples are discussed herein, e.g., with reference to operations 402 and 412.

At 810, the control unit can select, for each of the plurality of terminals attached to the network base station, a respective DTM 812 (which can represent DTM 308) based at least in part on the channel condition information (CCI) 808, or other respective CCI associated with that terminal (e.g., as discussed herein with reference to CCI 310). The respective DTMs 812 can be selected from a predetermined set 814 of DTMs. Examples are discussed herein, e.g., with reference to operation 306. The predetermined set 814 of DTMs can include the predetermined DTM 608. Although shown separately for clarity of illustration, DTM 608 can be one of the DTMs 812.

At 816, the control unit can determine a subframe allocation 818 (which can represent subframe allocation 316) based on information of a plurality of terminals attached to the network base station. The plurality of terminals can include, e.g., at least some of, or all of, the terminals attached to the network base station. For example, the plurality of terminals can include only those terminals attached to the base station that are using a particular DTM, e.g., TM4 or TM9 (e.g., in EN-DC configurations). The subframe allocation 818 can indicate, for each of a plurality of subframes (e.g., subframes 304) of a radio frame (e.g., frame 302), exactly one DTM of the predetermined set 814 of DTMs. Moreover, the subframe allocation 818 can indicate the one or more subframes associated with the predetermined DTM 608. Examples are discussed herein, e.g., with reference to operation 314. In some illustrative network configurations, increasing the rate of reference-signal transmission reduces the resources available for the PDSCH. In these configurations, the rate of transmission is increased when more VoLTE (or other GBR) users (or bearers) are active than non-realtime (or other non-GBR) users.

In some examples, the subframe allocation 818 indicates a first subset of the plurality of subframes and a second, disjoint subset of the plurality of subframes. Examples are discussed herein, e.g., with reference to first subset 514 and second subset 516. The first subset 514 can include the one or more subframes associated with the predetermined DTM 608. The predetermined DTM 608 can be TM9. The subframe allocation 818 can assign the subframes of the first subset 514 as MBSFN subframes associated with TM9. The subframe allocation 818 can also assign the subframes of the second subset 516 as non-MBSFN subframes. In some of these examples, the number of MBSFN subframes can be controlled (operation 816) based on the number of TM9 terminals 102 attached to the base station, and the rate of CSI-RS transmissions can be controlled (operations 610, 706) based on the type of traffic to or from those TM9 terminals 102.

At 820, the control unit can transmit downlink data 822 (which can represent downlink data 320) to at least a first terminal of the plurality of terminals during a first subframe of the one or more subframes associated with the predetermined DTM 608 based at least in part on the subframe allocation 818. Examples are discussed herein, e.g., with reference to operation 318. Downlink data 822 can include or be associated with control information, as discussed above.

As noted above, operations 616 and 820 can be performed in a coordinated manner. For example, during an MBSFN subframe, CSI-RS reference signals 614 (operation 616) can be transmitted in the PDSCH along with DL data 822 (operation 820), all using TM9.

Some examples of FIGS. 3-8 can use an algorithm such as that listed in Table 1.

TABLE 1

```
If (# of QCI1 users ≥ 40%) and (MBSFN allocated Subframes < 40%):
        Wait 100 ms
        MBSFN+= 1
        Send measurement report to NR
        NR Subframes scheduling −= 10%
Else If #of QCI1 users<40% <= MBSFN allocated Subframes:
        Wait 100 ms
        Send measurement report to NR
        NR Subframes scheduling += 10%
```

Other examples can use Table 1, except with at least one of (or all of) of the numeric values (e.g., the 100-ms time intervals or ±10% percentages) changed to a different value. Some examples can use Table 1, or Table 1 with numeric adjustment, for GBR traffic other than QCI1.

Figure 9:
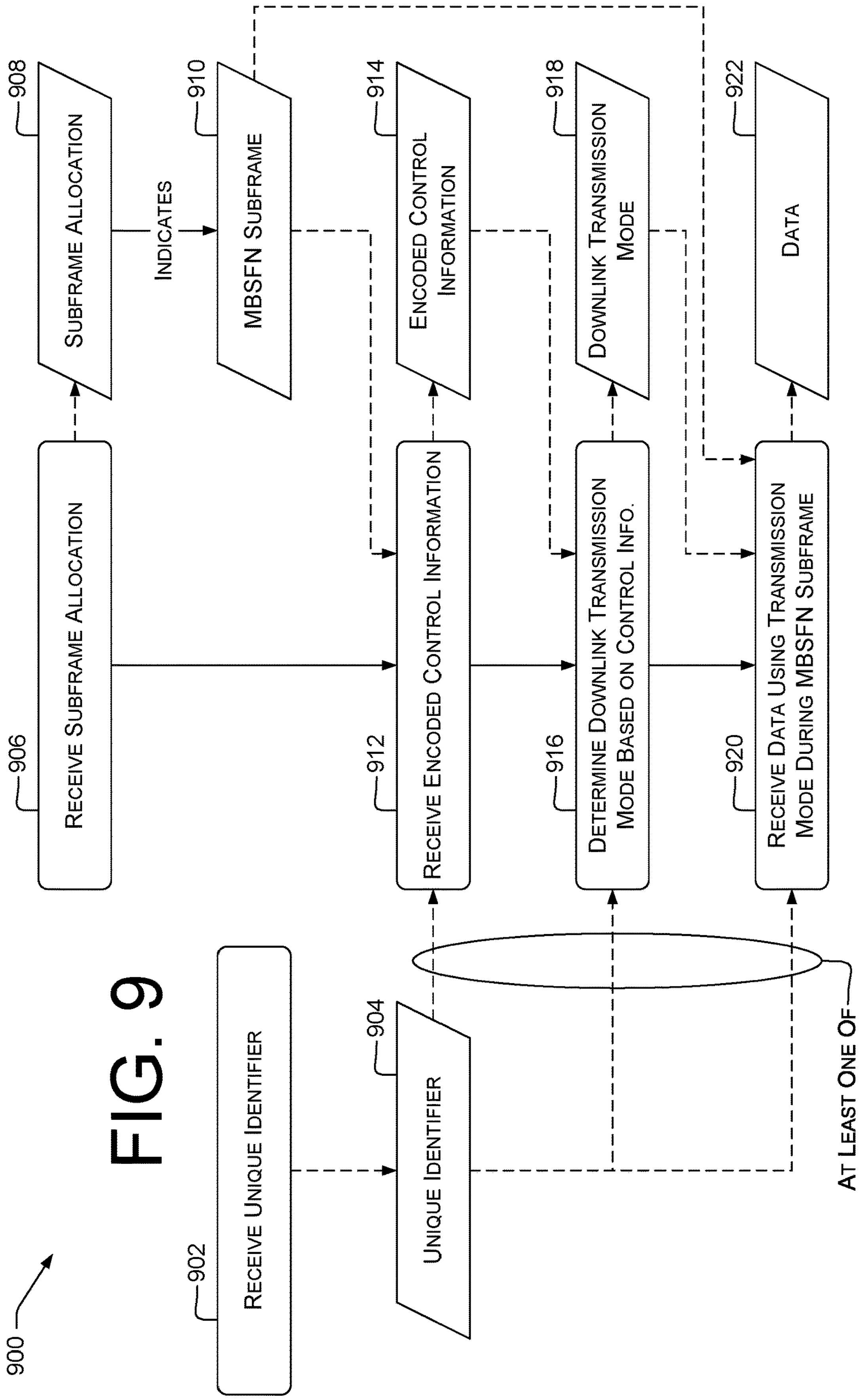
FIG. 9 illustrates an example process for receiving data during Multimedia Broadcast Multicast Service (MBMS) Single Frequency Network (MBSFN) subframes according to some implementations. For clarity, control flow is shown using solid lines and dataflow is shown using dashed lines.

FIG. 9 is a dataflow diagram illustrating an example process 900 for receiving data, and related data items. Process 900 can be performed, e.g., by a control unit of a terminal (e.g., terminal 102 or 202). In some examples, the control device includes one or more processors (e.g., processor 214) configured to perform operations described below, e.g., in response to computer program instructions of the detection module 222. In some examples, the terminal can include a network interface 218 configured to communicate wirelessly with one or more entry nodes 108, 112 or other server(s) 204 of the network 100, 206. For clarity, in FIGS. 9 and 10, control flow is shown using solid lines and dataflow is shown using dashed lines.

At 902, the control unit can receive, via a wireless communications interface such as network interface 218, a unique identifier 904. For example, the control unit can receive a cell-radio network temporary identifier (C-RNTI) or other identifier used to scramble or otherwise mark data specific to the control unit or terminal 102, 202 operated by the control unit. Other example identifiers can include a TC-RNTI (temporary C-RNTI), CS-RNTI (configured scheduling RNTI), SI-RNTI (system information RNTI), RA-RNTI (random-access RNTI), or P-RNTI (paging RNTI) (see, e.g., 3GPP 38.214). Operation 902 can be performed before, concurrently with, or after operation 906. As used herein, the term "unique identifier" and similar terms encompass both truly unique identifiers (e.g., Ethernet MAC addresses that are unique by construction, or Version 1 UUIDs) and identifiers with a negligible probability of collision (non-uniqueness) (e.g., SHA256 hashes of data uniquely identifying an object, or Version 4 UUIDs).

At 906, the control unit can receive, via the wireless communications interface, a subframe allocation 908 (which can represent subframe allocation 316, 422, or 818). The subframe allocation 908 can indicate a Multimedia Broadcast Multicast Service (MBMS) Single Frequency Network (MBSFN) subframe 910 (e.g., at least one of the hatched subframes 304 of subframe allocation 316, FIG. 3) of a radio frame (e.g., frame 302, FIG. 3). MBSFN subframe 910 can represent first subframe 410, a subframe in first subset 514 of subframes, or a subframe of subframes 618, At 912, the control unit can receive, via the wireless communications interface during the MBSFN subframe 910, encoded control information 914. For example, the control unit can receive transmissions on a physical downlink control channel (PDCCH) in, e.g., at least one of the first two OFDM symbols of the MBSFN subframe 910. Encoded control information 914 can represent data transmitted at operations 318, 424, or 820, e.g., downlink data 320, 426, or 822, or control information associated with either of those.

In some examples, the control unit can further determine the encoded control information 914 based at least in part on the unique identifier 904. For example, the control unit can perform a blind search for the encoded control information 914, and locate the encoded control information 914 based on successful verification of a CRC scrambled with the unique identifier 904. In other examples, at operation 912, the control unit can store received PDCCH data for later search.

Because a subframe can include data intended for more than one terminal 102, control information 914, e.g., Downlink Control Information (DCI), in a subframe (e.g., in the subframe's PDCCH) can be marked in part using unique identifiers 904 for those terminals 102 to distinguish between control information 914 intended for different terminals 102. In some examples, the unique identifiers 904 can be scrambled in the control information 914 with a cyclic redundancy check (CRC) or other checksum, or those CRCs or checksums can be scrambled with the unique identifiers 904, such that individual terminals 102 can only descramble the portion of the control information 914 marked with their unique identifier 904.

In some examples, a terminal's unique identifier 904 can be a C-RNTI that is assigned to the terminal 102 by an entry node 108 when the terminal 102 initially connects to that entry node 108. As such, control information 914 within subframes transmitted by an entry node 108 can be marked with C-RNTIs to identify control information 914 for corresponding terminals 102. A particular terminal 102 can accordingly use control information 914 that is marked with its C-RNTI to locate and interpret resource blocks in the PDSCH that contain data for that particular terminal 102.

When a terminal 102 receives a new subframe from an entry node 108, it may not know whether that particular subframe contains any data for the terminal 102. Accordingly, the terminal 102 can perform a blind search of the PDCCH on the physical layer to determine if it contains any control information 914 marked with the terminal's identifier, such as the terminal's C-RNTI, as described above. If it does, the terminal 102 can use the control information 914 marked with the terminal's identifier to locate and/or decode control information 914 or other downlink data (e.g., in the PDSCH) that is intended for that terminal 102.

As discussed above, downlink data for a particular terminal 102 can be encoded differently depending on the transmission mode selected for the radio frame 302 or subframe 304 by the entry node 108 for that terminal 102. Each of the multiple transmission modes can correspond to a different DCI format that can be used to encode the control information 914 (e.g., in the PDCCH). For example, 3GPP's DCI format 2 can be associated with TM4, while 3GPP's DCI format 2C can be associated with TM9. Because the control information 914 for a particular terminal 102 can be encoded using different DCI formats depending on which transmission mode the entry node 108 is actually using for the terminal 102 in the current radio frame 302 or subframe 304, during a blind search of the PDCCH the terminal 102 may only be able to identify whether a subframe contains control information 914 marked with the terminal's identifier if the terminal 102 uses the correct DCI format to interpret the control information 914. This permits each terminal 102 to identify its own encoded control information 914.

At 916, the control unit can determine a downlink transmission mode (DTM) 918 based at least in part on the encoded control information 914 and the unique identifier. In some examples, the encoded control information 914 comprises a DCI record listing the DTM 918 (e.g., encoded as an ASN.1 ENUMERATED or other type). Additionally or alternatively, the DCI record can include a format indicator, or (as discussed above) be of a specific format, that is uniquely associated with a particular DTM. In this way, the presence of the DCI record of that format indicates the DTM 918. In some examples, the DTM 918 is TM9. DTM 918 can represent a DTM 308 or other element of set 312 of DTMs; second DTM 418; predetermined DTM 518, 608; or a DTM 812 or other element of set 814 of DTMs.

In some examples, the control unit can determine the DTM 918 further based at least in part on the unique identifier 904. For example, the control unit can verify a CRC of a DCI record listing or associated with the DTM 918 using the unique identifier 904.

In some examples, the control unit can determine other network parameters, e.g., by decoding upper-layer messages carried in the encoded control information 914. For example, based on received encoded control information 914 at the PHY layer, the control unit can decode MAC, RLC, PDCP, and RRC layers (in that order) to extract an RRCConnectionReconfiguration message. The RRCConnectionReconfiguration message can indicate, e.g., the rate 528, 612, or 708 of reference-signal transmission, or other parameters of the network.

At 920, the control unit can receive data 922 using the DTM during the MBSFN subframe 910. This can permit multiplexing transmission modes within a single radio frame, which is not possible in some prior schemes. Data 922 can represent DL data 320, 426, or 822, or control information associated therewith, as discussed above.

In some examples, the control unit can receive the data 922 further based at least in part on the unique identifier 904. For example, the control unit can descramble PDSCH data 922 using the unique identifier 904, or verify a checksum of the data 922 using the unique identifier 904.

In some examples, the unique identifier 904 is an input to exactly one of operations 912, 916, and 920 (shown as "at least one of"). In other examples, the unique identifier 904 is an input to more than one of (e.g., all of) operations 912, 916, and 920.

Figure 10:
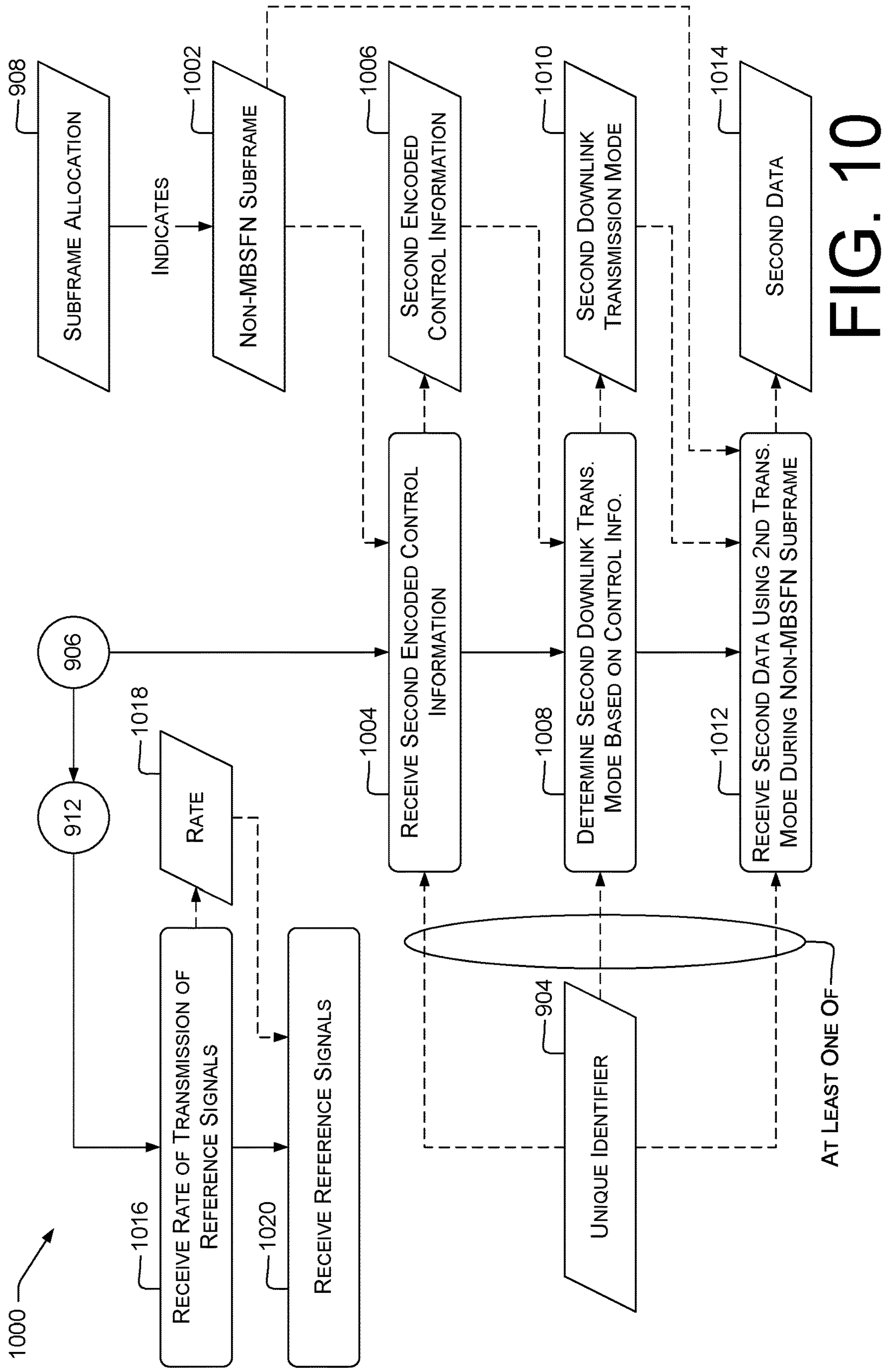
FIG. 10 illustrates an example process for receiving data in non-MBSFN subframes according to some implementations. For clarity, control flow is shown using solid lines and dataflow is shown using dashed lines.

FIG. 10 is a dataflow diagram illustrating an example process 1000 for receiving data, and related data items. Process 1000 can be performed, e.g., by a control unit of a terminal (e.g., terminal 102 or 202), e.g., in response to computer program instructions of the detection module 222. In some examples, operation 906 is followed by operation 1004. In some examples, operation 912 is followed by operation 1016.

In some examples of process 1000, the subframe allocation 908 further indicates a non-MBSFN subframe 1002 of the radio frame (e.g., radio frame 302). The non-MBSFN subframe 1002 can be a different subframe from the MBSFN subframe 910. Non-MBSFN subframe 1002 can represent first subframe 410, a subframe in first subset 514 of subframes, or a subframe of subframes 618, At 1004, the control unit can receive, via the wireless communications interface during the non-MBSFN subframe, second encoded control information 1006 (e.g., PDCCH values). Examples are discussed herein, e.g., with reference to operation 912. The control unit can determine the second encoded control information 1006 further based at least in part on the unique identifier 904, although this is not required in all examples. Second encoded control information 1006 can represent data transmitted at operations 318, 424, or 820, e.g., downlink data 320, 426, or 822, or control information associated with either of those.

At 1008, the control unit can determine a second DTM 1010 based at least in part on the second encoded control information. Examples are discussed herein, e.g., with reference to operation 916. In some examples, the second DTM 1010 is different from the DTM 918. The control unit can determine the second DTM 1010 further based at least in part on the unique identifier 904, although this is not required in all examples. Second DTM 1010 can represent a DTM 308 or other element of set 312 of DTMs; second DTM 418; predetermined DTM 518, 608; or a DTM 812 or other element of set 814 of DTMs.

At 1012, the control unit can receive second data 1014 using the second DTM 1010 during the non-MBSFN subframe 1002. Examples are discussed herein, e.g., with reference to operation 920. The control unit can receive or determine the second data 1014 further based at least in part on the unique identifier 904, although this is not required in all examples. Second data 1014 can represent DL data 320, 426, or 822, or control information associated therewith, as discussed above.

At 1016, in some examples, the control unit can determine, based at least in part on the encoded control information 914 (and, in some examples, on the unique identifier 904), a rate 1018 of transmission of reference signals. For example, the rate 1018 can be carried in an RRCConnectionReconfiguration or other message at a layer higher than the PHY, or in a PHY-specific message. In some examples, the rate 1018 can be represented as a span of time (e.g., expressed in terms of OFDM symbols) between reference-signal transmissions. In some examples, the rate can be represented as one or more resource-element locations in which reference signals are transmitted. The determined rate can represent rate 528, 612, or 708.

At 1020, the control unit can receive the reference signals based at least in part on the rate 1018. For example, the control unit can extract resource-element locations from the rate 1018, or determine resource-element locations based on time-span or -offset parameters indicated in the rate 1018. The control unit can then receive data of those resource elements and treat the received data as data of a reference signal.

Various examples of process 1000 permit using two transmission modes during a frame. For example, a terminal 102 may have a traffic mix and radio environment that is able to take advantage of both TM4 and TM9. Process 1000 can permit doing so. Additionally or alternatively, DTM 918 can be an LTE DTM and second DTM 1010 can be an NR DTM (or, equivalently, an NR downlink transmission scheme, 3GPP 38.214), or vice versa. Process 1000 can permit a dual-connectivity terminal 102 to communicate effectively via overlaid LTE and NR, or other combinations of access networks.

Example Clauses

Various examples include one or more of, including any combination of any number of, the following example features. Throughout these clauses, parenthetical remarks are for example and explanation, and are not limiting.

A: A network base station, comprising: a communications interface configured to communicate wirelessly with one or more terminals of the network; and a control unit connected with the communications interface and configured to perform operations comprising: selecting, for each of the one or more terminals, a respective downlink transmission mode (DTM) based at least in part on respective channel condition information (CCI), wherein the respective DTMs are selected from a predetermined set of DTMs; determining a subframe allocation based at least in part on the selected DTMs, wherein the subframe allocation indicates exactly one DTM of the predetermined set of DTMs for each of a plurality of subframes of a radio frame; and transmitting downlink data to at least one of the one or more terminals using the communications interface based at least in part on the subframe allocation.

B: The network base station according to paragraph A, the operations further comprising: receiving, using the communications interface, the respective channel condition information for at least one of the one or more terminals.

C: The network base station according to paragraph A or B, wherein: the predetermined set of DTMs consists of Third-Generation Partnership Project Transmission Mode Four and Third-Generation Partnership Project Transmission Mode Nine; the subframe allocation indicates a first subset of the plurality of subframes and a second, disjoint subset of the plurality of subframes; the subframe allocation assigns the subframes of the first subset as Multimedia Broadcast Multicast Service (MBMS) Single Frequency Network (MBSFN) subframes associated with Transmission Mode Nine; and the subframe allocation assigns the subframes of the second subset as non-MBSFN subframes associated with Transmission Mode Four.

D: The network base station according to any of paragraphs A-C, the operations further comprising: transmitting a terminal-specific reference signal to a first terminal of the one or more terminals using the communications interface based at least in part on the subframe allocation; subsequently, receiving second CCI associated with the terminal-specific reference signal; and selecting a second DTM for the first terminal based at least in part on the second CCI.

E: The network base station according to paragraph D, the operations further comprising: determining a second subframe allocation based at least in part on the second DTM; and transmitting second downlink data to the first terminal using the communications interface based at least in part on the second subframe allocation.

F: The network base station according to paragraph D or E, wherein: the first subframe allocation assigns a first subframe of the plurality of subframes as an MBSFN subframe associated with Third-Generation Partnership Project Transmission Mode Nine; and the operations comprise: transmitting the terminal-specific reference signal during the first subframe; and determining the second subframe allocation assigning the first subframe as a non-MBSFN subframe associated with Third-Generation Partnership Project Transmission Mode Four.

G: The network base station according to any of paragraphs A-F, wherein the network base station is associated with a first access network of a first type, the operations further comprising: receiving, from a second base station associated with a second access network of a second, different type, second-network load information of the second access network; determining the subframe allocation based at least in part on the second-network load information, wherein the subframe allocation indicates, for each subframe of the plurality of subframes, whether that subframe is associated with the first access network or the second access network; and transmitting at least a portion of the subframe allocation to the second base station.

H: The network base station according to paragraph G, the operations further comprising, before receiving the second-network load information, sending a request for the second-network load information to the second base station.

I: The network base station according to any of paragraphs A-H, wherein: the network base station further comprises a full-dimension multiple-input multiple-output (FD-MIMO) antenna array connected with the communications interface; and the operations comprise transmitting at least some of the downlink data to a first terminal of the one or more terminals in a formed beam using the FD-MIMO antenna array.

J: The network base station according to any of paragraphs A-I, wherein: the subframe allocation indicates a first subset of the plurality of subframes and a second, disjoint subset of the plurality of subframes; the first subset is associated with a predetermined DTM of the predetermined set of DTMs; and the operations further comprise: determining a first proportion of traffic being carried by the network base station that is first traffic, wherein the first traffic: is guaranteed bit-rate (GBR) traffic; and is associated with the predetermined downlink transmission mode (DTM); determining, based at least in part on the first proportion, a first rate of transmission of reference signals associated with the predetermined DTM; and transmitting the reference signals associated with the predetermined DTM substantially at the first rate and during one or more subframes of the first subset.

K: A method comprising, by a network base station in a wireless network: determining a first proportion of traffic being carried by the network base station that is first traffic, wherein the first traffic: is guaranteed bit-rate (GBR) traffic; and is associated with terminals communicating with the network base station using a predetermined downlink transmission mode (DTM); determining, based at least in part on the first proportion, a first rate of transmission of reference signals associated with the predetermined DTM; and transmitting the reference signals associated with the predetermined DTM substantially at the first rate and during one or more subframes associated with the predetermined DTM.

L: The method according to paragraph K, further comprising, by the network base station, after determining the first rate: determining a second proportion of traffic being carried by the network base station that is first traffic; determining, based at least in part on the second proportion, a second rate of transmission of reference signals associated with the predetermined DTM; and transmitting the reference signals associated with the predetermined DTM substantially at the second rate and during the one or more subframes associated with the predetermined DTM; wherein: the first proportion is higher than the second proportion; and the first rate is higher than the second rate.

M: The method according to paragraph K or L, wherein: the predetermined DTM is Third-Generation Partnership Project Transmission Mode Nine; and the reference signals associated with the predetermined DTM are Channel-State Information-Reference Signal (CSI-RS) signals.

N: The method according to any of paragraphs K-M, further comprising, by the network base station: determining a subframe allocation based on information of a plurality of terminals attached to the network base station, wherein: the subframe allocation indicates, for each of a plurality of subframes of a radio frame, exactly one DTM of a predetermined set of DTMs; the predetermined set of DTMs comprises the predetermined DTM; and the subframe allocation indicates the one or more subframes associated with the predetermined DTM; and transmitting downlink data to at least a first terminal of the plurality of terminals during a first subframe of the one or more subframes associated with the predetermined DTM based at least in part on the subframe allocation.

O: The method according to paragraph N, further comprising, by the network base station: selecting, for each of the plurality of terminals attached to the network base station, a respective DTM based at least in part on respective channel condition information (CCI), wherein the respective DTMs are selected from the predetermined set of DTMs.

P: The method according to paragraph O, wherein: the method further comprises, by the network base station: transmitting a first terminal-specific reference signal of the reference signals to the first terminal in one of the one or more subframes associated with the predetermined DTM; and receiving first CCI from the first terminal; and the first CCI is associated with the first terminal-specific reference signal.

Q: The method according to any of paragraphs N-P, wherein: the subframe allocation indicates a first subset of the plurality of subframes and a second, disjoint subset of the plurality of subframes; the first subset comprises the one or more subframes associated with the predetermined DTM; the predetermined DTM is Third-Generation Partnership Project Transmission Mode Nine; the subframe allocation assigns the subframes of the first subset as Multimedia Broadcast Multicast Service (MBMS) Single Frequency Network (MBSFN) subframes associated with Transmission Mode Nine; and the subframe allocation assigns the subframes of the second subset as non-MBSFN subframes.

R: One or more computer-readable media comprising instructions that, when executed by at least one processor, cause the at least one processor to perform operations comprising: receiving, via a wireless communications interface, a unique identifier; receiving, via the wireless communications interface, a subframe allocation indicating a Multimedia Broadcast Multicast Service (MBMS) Single Frequency Network (MBSFN) subframe of a radio frame; receiving, via the wireless communications interface during the MBSFN subframe, encoded control information; determining a downlink transmission mode (DTM) based at least in part on the encoded control information; and receiving data using the DTM during the MBSFN subframe, wherein the operations further comprise at least one of: determining the encoded control information further based at least in part on the unique identifier; determining the DTM further based at least in part on the unique identifier; or receiving the data further based at least in part on the unique identifier.

S: The one or more computer-readable media according to paragraph R, wherein: the subframe allocation further indicates a non-MBSFN subframe of the radio frame, the non-MBSFN subframe different from the MBSFN subframe; and the operations further comprise: receiving, via the wireless communications interface during the non-MBSFN subframe, second encoded control information; determining a second DTM based at least in part on the second encoded control information, the second DTM different from the DTM; and receiving second data using the second DTM during the non-MBSFN subframe.

T: The one or more computer-readable media according to paragraph R or S, wherein: the encoded control information comprises a Downlink Control Information (DCI) record; and the DTM is Third-Generation Partnership Project Transmission Mode Nine.

U: The one or more computer-readable media according to any of claims R-T, the operations further comprising: determining, based at least in part on the encoded control information, a rate of transmission of reference signals; and receiving the reference signals based at least in part on the rate.

V: A computer-readable medium, e.g., a computer storage medium, having thereon computer-executable instructions, the computer-executable instructions upon execution configuring a computer to perform operations as any of paragraphs A-J, K-Q, or R-U recites.

W: A device comprising: a processor; and a computer-readable medium, e.g., a computer storage medium, having thereon computer-executable instructions, the computer-executable instructions upon execution by the processor configuring the device to perform operations as any of paragraphs A-J, K-Q, or R-U recites.

X: A system comprising: means for processing; and means for storing having thereon computer-executable instructions, the computer-executable instructions including means to configure the system to carry out a method as any of paragraphs A-J, K-Q, or R-U recites.

AB: A network terminal configured to perform operations as any of paragraphs R-U recites.

AC: A network control device configured to perform operations as any of paragraphs A-J or K-Q recites.

CONCLUSION

Various aspects described above permit load-balancing radio resources between transmission modes, access networks, or both. Various aspects permit adjusting reference-signal transmission rates depending on the type of traffic, to provide increased reliability of GBR traffic and increased capacity of non-GBR traffic. As discussed above, technical effects of various examples can include controlling bandwidth usage, reducing network load, and increasing network reliability.

Example components FIGS. 1 and 2, example data exchanges and process blocks in FIGS. 3-10, and other methods, processes, or operations described above can be embodied in, and fully automated via, hardware, firmware, or software code modules embodied in or executed by one or more computers, processors, or other control units. As used herein, the term "module" is intended to represent example divisions of the described operations for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS). In other instances, the functionality and/or modules may be implemented as part of a device driver, firmware, application, or other software subsystem. Software implementing the techniques described above can be distributed on various types of computer-readable media, not limited to the forms of memory that are specifically described.

Example computer-implemented operations described herein can additionally or alternatively be embodied in specialized computer hardware, e.g., FPGAs. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Many variations and modifications can be made to the above-described examples, the elements of which are to be understood as being among other acceptable examples. All such modifications and variations are intended to be included herein within the scope of this disclosure and protected by the claims. For example, structures or operations described with respect to a single server or device can be performed by each of multiple devices, independently or in a coordinated manner, except as expressly set forth herein. Similarly, although some features and examples herein have been described in language specific to structural features and/or methodological steps, it is to be understood that the appended claims are not necessarily limited to the specific features or steps described herein. Rather, the specific features and steps are disclosed as preferred forms of implementing the claimed invention. For example, network 206, processors 214 and 230, and other structures or systems described herein for which multiple types of implementing devices or structures are listed can include any of the listed types, and/or multiples and/or combinations thereof.

Some operations of example processes or devices herein are illustrated in individual blocks and logical flows thereof, and are summarized with reference to those blocks. The order in which the operations are described is not intended to be construed as a limitation unless otherwise indicated. Any number of the described operations can be executed, or data transmissions performed, in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order.

Moreover, this disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc., can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

In the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. A system, comprising:

at least one processor; and memory storing instructions that, when executed by the at least one processor, cause the at least one processor to perform operations, comprising:

receiving, via a wireless communications interface, a unique identifier;

receiving, via the wireless communications interface, a subframe allocation indicating a multimedia broadcast multicast service (MBMS) single frequency network (MBSFN) subframe of a radio frame;

receiving, via the wireless communications interface and in the MBSFN subframe, control information that is encoded;

determining a downlink transmission mode (DTM) based at least in part on the control information; and receiving data using the DTM in the MBSFN subframe, wherein the operations further comprise at least one of:

determining the control information further based at least in part on the unique identifier;

determining the DTM further based at least in part on the unique identifier; or receiving the data further based at least in part on the unique identifier.

2. The system of claim 1, wherein the at least one of the determining the control information, the determining the DTM, or the receiving the data based at least in part one the unique identifier further comprises:

determining the control information based at least in part one the unique identifier.

3. The system of claim 1, wherein the at least one of the determining the control information, the determining the DTM, or the receiving the data based at least in part one the unique identifier further comprises:

determining the DTM based at least in part one the unique identifier.

4. The system of claim 1, wherein the at least one of the determining the control information, the determining the DTM, or the receiving the data based at least in part one the unique identifier further comprises:

determining the data based at least in part one the unique identifier.

5. The system of claim 1, wherein the unique identifier is identified from among unique identifiers that are scrambled in the control information.

6. The system of claim 1, wherein the unique identifier is identified from among unique identifiers that are scrambled in the control information with a cyclic redundancy check (CRC).

7. The system of claim 1, wherein the unique identifier is identified from among unique identifiers that are scrambled in the control information with a checksum.

8. The system of claim 1, the operations further comprising:

descrambling, with the unique identifier, the control information based on the control information being marked with the unique identifier.

9. A method, comprising:

receiving, via a wireless communications interface, a unique identifier;

receiving, via the wireless communications interface, a subframe allocation indicating a multimedia broadcast multicast service (MBMS) single frequency network (MBSFN) subframe of a radio frame;

receiving, via the wireless communications interface in the MBSFN subframe, control information;

determining a downlink transmission mode (DTM) based at least in part on the control information; and receiving data using the DTM in the MBSFN subframe, further comprising at least one of:

determining the control information further based at least in part on the unique identifier;

determining the DTM further based at least in part on the unique identifier; or receiving the data further based at least in part on the unique identifier.

10. The method of claim 9, wherein the at least one of the determining the control information, the determining the DTM, or the receiving the data based at least in part one the unique identifier further comprises:

determining the control information based at least in part one the unique identifier.

11. The method of claim 9, wherein the at least one of the determining the control information, the determining the DTM, or the receiving the data based at least in part one the unique identifier further comprises:

determining the DTM based at least in part one the unique identifier.

12. The method of claim 9, wherein the at least one of the determining the control information, the determining the DTM, or the receiving the data based at least in part one the unique identifier further comprises:

determining the data based at least in part one the unique identifier.

13. The method of claim 9, wherein the subframe allocation further indicates a non-MBSFN subframe of the radio frame, the non-MBSFN subframe different from the MBSFN subframe, the operations further comprise:

receiving, via the wireless communications interface during the non-MBSFN subframe, second control information;

determining a second DTM based at least in part on the second control information, the second DTM different from the DTM; and receiving second data using the second DTM during the non-MBSFN subframe.

14. The method of claim 9, wherein:

the control information comprises a downlink control information (DCI) record; and the DTM is 3GPP transmission mode nine.

15. The method of claim 9, wherein the unique identifier is identified from among unique identifiers that are scrambled in the control information with a cyclic redundancy check (CRC).

16. The method of claim 9, wherein the unique identifier is identified from among unique identifiers that are scrambled in the control information with a checksum.

17. A server, comprising:

at least one processor; and memory storing instructions that, when executed by the at least one processor, cause the at least one processor to perform operations comprising:

receiving, via a wireless communications interface, a unique identifier;

receiving, via the wireless communications interface, a subframe allocation indicating a multimedia broadcast multicast service (MBMS) single frequency network (MBSFN) subframe of a radio frame;

receiving, via the wireless communications interface in the MBSFN subframe, control information;

determining a downlink transmission mode (DTM) based at least in part on the control information; and receiving data using the DTM in the MBSFN subframe, wherein the operations further comprise at least one of:

determining the control information further based at least in part on the unique identifier;

determining the DTM further based at least in part on the unique identifier; or receiving the data further based at least in part on the unique identifier.

18. The server of claim 17, wherein the at least one of the determining the control information, the determining the DTM, or the receiving the data based at least in part one the unique identifier further comprises:

determining the control information based at least in part one the unique identifier.

19. The server of claim 17, wherein the at least one of the determining the control information, the determining the DTM, or the receiving the data based at least in part one the unique identifier further comprises:

determining the DTM based at least in part one the unique identifier.

20. The server of claim 17, wherein the at least one of the determining the control information, the determining the DTM, or the receiving the data based at least in part one the unique identifier further comprises:

determining the data based at least in part one the unique identifier.

* * * * *